United States Patent
Cheng et al.

(10) Patent No.: US 12,045,704 B2
(45) Date of Patent: Jul. 23, 2024

(54) SYSTEM, METHOD, AND COMPUTER PROGRAM PRODUCT FOR TIME-BASED ENSEMBLE LEARNING USING SUPERVISED AND UNSUPERVISED MACHINE LEARNING MODELS

(71) Applicant: Visa International Service Association, San Francisco, CA (US)

(72) Inventors: Yinhe Cheng, Austin, TX (US); Yu Gu, Austin, TX (US); Sam Peter Hamilton, Los Altos, CA (US)

(73) Assignee: Visa International Service Association, San Francisco, CA (US)

( * ) Notice: Subject to any disclaimer, the term of this patent is extended or adjusted under 35 U.S.C. 154(b) by 18 days.

(21) Appl. No.: 17/785,429

(22) PCT Filed: Jan. 20, 2022

(86) PCT No.: PCT/US2022/013047
§ 371 (c)(1),
(2) Date: Jun. 15, 2022

(87) PCT Pub. No.: WO2023/140841
PCT Pub. Date: Jul. 27, 2023

(65) Prior Publication Data
US 2023/0229976 A1    Jul. 20, 2023

(51) Int. Cl.
*G06N 20/20*    (2019.01)
(52) U.S. Cl.
CPC ............................. *G06N 20/20* (2019.01)

(58) Field of Classification Search
CPC ........................................................ G06N 20/20
(Continued)

(56) References Cited

U.S. PATENT DOCUMENTS 11,397,272 B2 *  7/2022  Liu .......................... G01V 1/28
2016/0358099 A1  12/2016  Sturlaugson et al.
(Continued)

OTHER PUBLICATIONS

Dong et al., "A survey on ensemble learning", Front. Comput. Sci. 2020, 14(2):241-258 (Year: 2020).*
(Continued)

*Primary Examiner* — Tsu-Chang Lee
(74) *Attorney, Agent, or Firm* — The Webb Law Firm

(57) ABSTRACT

Provided are systems for ensemble learning with machine learning models that include a processor to receive a training dataset of a plurality of data instances, wherein each data instance comprises a time series of data points, add an amount of time delay to one or more data instances to provide an augmented training dataset, select a first plurality of supervised machine learning models, select a second plurality of unsupervised machine learning models, train the first plurality of supervised machine learning models and the second plurality of unsupervised machine learning models based on the augmented training dataset, generate an ensemble machine learning model based on outputs of the supervised machine learning models and unsupervised machine learning models, and generate a runtime output of the ensemble machine learning model based on a runtime input to the ensemble machine learning model. Methods and computer program products are also provided.

9 Claims, 8 Drawing Sheets

(58) Field of Classification Search
USPC .......................................................... 706/12
See application file for complete search history.

(56) References Cited

U.S. PATENT DOCUMENTS

| | | |
|---|---|---|
| 2018/0150757 A1 | 5/2018 | Aggarwal et al. |
| 2019/0095618 A1 | 3/2019 | Lim |
| 2021/0110313 A1 | 4/2021 | Jones |
| 2021/0160247 A1 | 5/2021 | Gaddam et al. |
| 2022/0019808 A1* | 1/2022 | Kang ................... G06V 20/47 |

OTHER PUBLICATIONS

Zainab et al., "Ensemble-Based Spam Detection in Smart Home IoT Devices Time Series Data Using Machine earning Techniques", MDPI Information, Jul. 2, 2020, 15 pages.

* cited by examiner

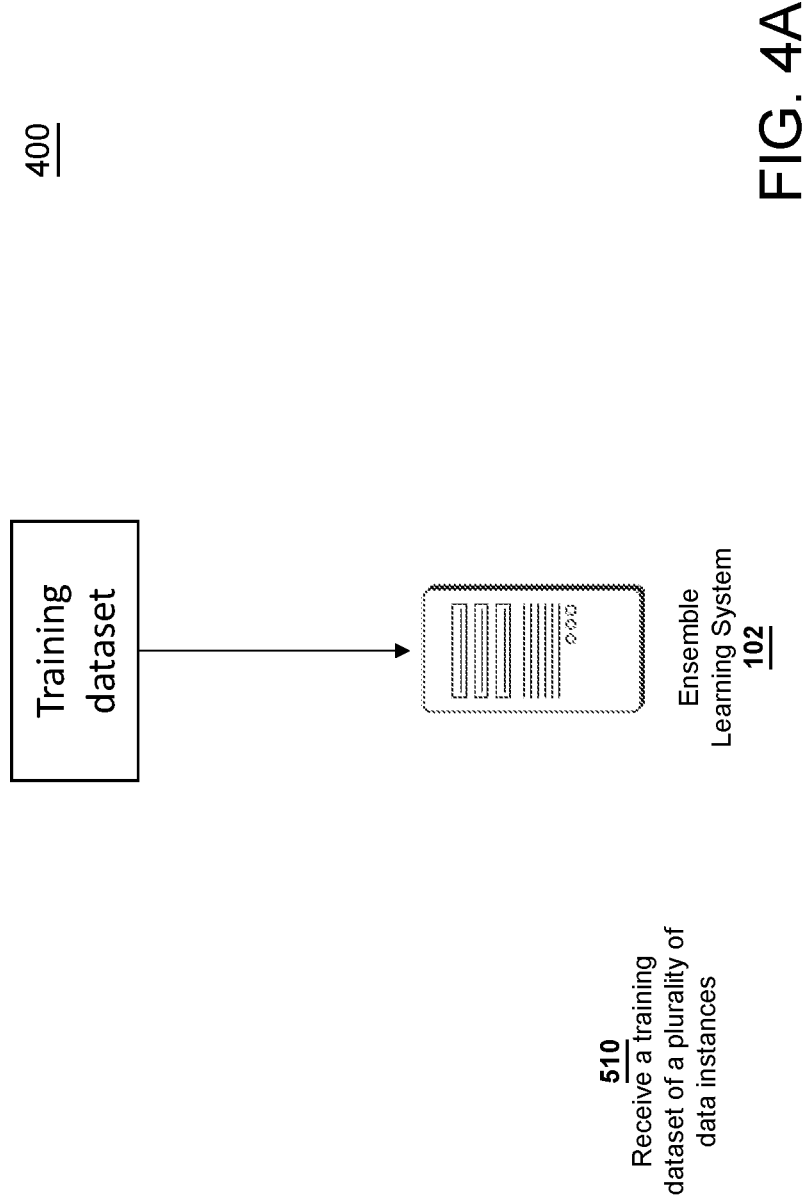

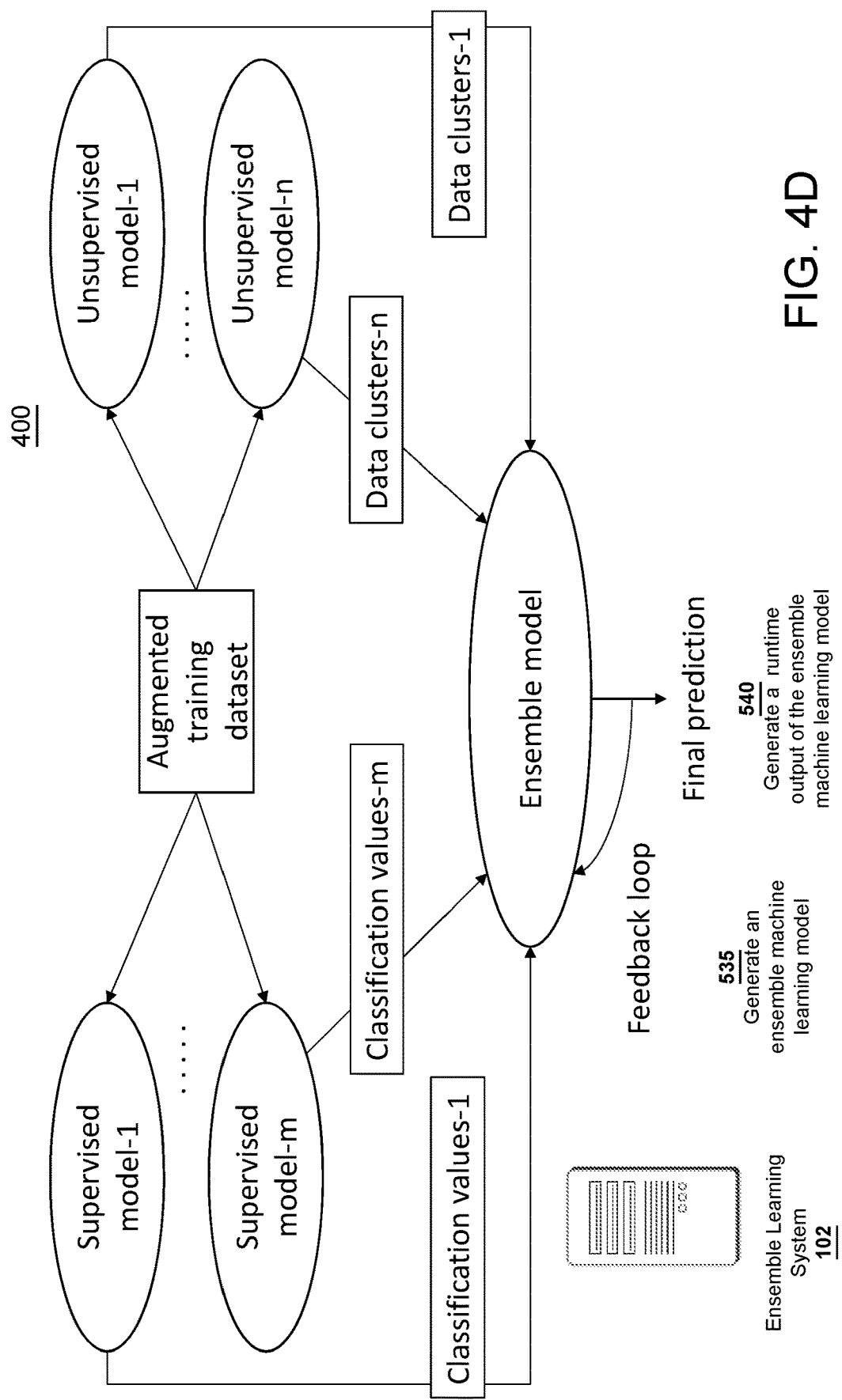

SYSTEM, METHOD, AND COMPUTER PROGRAM PRODUCT FOR TIME-BASED ENSEMBLE LEARNING USING SUPERVISED AND UNSUPERVISED MACHINE LEARNING MODELS

CROSS-REFERENCE TO RELATED APPLICATION

This application is the United States national phase application of International Application No. PCT/US2022/013047 filed Jan. 20, 2022, the entire disclosure of which is hereby incorporated by reference in its entirety.

BACKGROUND

1. Technical Field

This disclosure relates generally to machine learning and, in some non-limiting embodiments or aspects, to systems, methods, and computer program products for generating a machine learning model based on an ensemble learning method using supervised and unsupervised techniques.

2. Technical Considerations

Machine learning may refer to a field of computer science that uses statistical techniques to provide a computer system with the ability to learn (e.g., to progressively improve performance of) a task with data without the computer system being explicitly programmed to perform the task. In some instances, a machine learning model may be developed for a set of data so that the machine learning model may perform a task (e.g., a task associated with a prediction) with regard to the set of data.

In some instances, a machine learning model, such as a predictive machine learning model, may be used to make a prediction regarding a risk or an opportunity based on a large amount of data (e.g., a large scale dataset). A predictive machine learning model may be used to analyze a relationship between the performance of a unit based on a large scale dataset associated with the unit and one or more known features of the unit. The objective of the predictive machine learning model may be to assess the likelihood that a similar unit will exhibit the same or similar performance as the unit. In order to generate the predictive machine learning model, the large scale dataset may be segmented so that the predictive machine learning model may be trained on data that is appropriate.

In some instances, multiclass classification (e.g., multinomial classification) may refer to a problem of classifying instances into one of three or more classes, whereas classifying instances into one of two classes may be referred to as binary classification.

Deep learning (e.g., deep structured learning) may refer to a category of machine learning algorithms based on artificial neural networks with representation learning, where the representation learning may be supervised, semi-supervised, and/or unsupervised. Machine learning architectures that are used for deep learning may include deep neural networks (DNNs), deep belief networks, deep reinforcement learning, recurrent neural networks, and convolutional neural networks.

In the field of deep learning, machine learning models are generally good at learning to perform specific tasks given a large dataset. As a dataset grows and changes overtime, the machine learning models that learned specific tasks on older datasets become stale and need to be trained on an updated dataset so the models can perform with the same accuracy or better given new data. This change in model performance as datasets change and expand is known as model freshness degradation.

Developing a machine learning model is time consuming and requires a large amount of data. If a classification model is built using a specific dataset, its accuracy may degrade over time if it is not updated and trained with new data. Model degradation may occur even faster when new patterns in data emerge due to sudden changes in the market or technology (e.g., technological changes, domain changes, market changes). Such machine learning models would require constant training and updating using new and emerging data to maintain or improve the model's accuracy over time.

Deep learning models in certain environments, such as online deep learning models, often face problems, such as data delay and model perturbations during training. Unlike offline models, online models are susceptible to real time changes in data and incomplete datasets. Such real time data changes can negatively affect model accuracy if model performance is heavily dependent on the completeness of the data used for training. For example, a classification model training on image data may receive many similar images as input with little variance. Even a single image with a minor difference in a heavily weighted feature can perturb a model and negatively affect its training. Additionally, if input image data is time sequenced, some images may be input into the model inconsistent with the sequence of other images and may negatively affect model training.

Given the problems described, it is evident there is a need for a machine learning/deep learning ensemble based training system, method, and computer program product to generate machine learning models using supervised and unsupervised techniques which are less susceptible to model degradation, data delay, and model perturbations.

SUMMARY

Accordingly, disclosed are systems, methods, and computer program products for generating a machine learning model based on an ensemble learning method using supervised and unsupervised techniques.

According to some non-limiting embodiments or aspects, provided is a method for ensemble learning with machine learning models to prevent model performance degradation. The system includes at least one processor programmed and/or configured to receive a training dataset of a plurality of data instances, wherein each data instance comprises a time series of data points. The at least one processor is also programmed and/or configured to add an amount of time delay to one or more data instances of the plurality of data instances to provide an augmented training dataset. The at least one processor is also programmed and/or configured to select a first plurality of supervised machine learning models and select a second plurality of unsupervised machine learning models. The at least one processor is further programmed and/or configured to train the first plurality of supervised machine learning models and the second plurality of unsupervised machine learning models based on the augmented training dataset. The at least one processor is further programmed and/or configured to generate an ensemble machine learning model based on outputs of the first plurality of supervised machine learning models and outputs of the second plurality of unsupervised machine learning models. The at least one processor is further programmed and/or configured to generate a runtime output of the ensemble machine learning model based on a runtime input to the ensemble machine learning model.

In some non-limiting embodiments or aspects, when adding the amount of time delay to one or more data instances of the plurality of data instances to provide the augmented training dataset, the at least one processor is further programmed and/or configured to add the amount of time delay to a plurality of labeled data instances to provide a plurality of augmented labeled data instances. The at least one processor is further programmed and/or configured to add the amount of time delay to a plurality of unlabeled data instances to provide a plurality of augmented unlabeled data instances. The augmented training dataset includes the plurality of augmented labeled data instances and the plurality of augmented unlabeled data instances.

In some non-limiting embodiments or aspects, the at least one processor is further programmed and/or configured to perform an action based on the runtime output of the ensemble machine learning model.

In some non-limiting embodiments or aspects, when generating the ensemble machine learning model, the at least one processor is programmed and/or configured to generate an output of the ensemble machine learning model based on the outputs of the first plurality of supervised machine learning models and the outputs of the second plurality of unsupervised machine learning models. The at least one processor is further programmed and/or configured to train the ensemble machine learning model using backpropagation based on the output of the ensemble machine learning model.

In some non-limiting embodiments or aspects, the at least one processor is further programmed and/or configured to add a perturbation to one or more additional data instances of the plurality of data instances. The at least one processor is further programmed and/or configured to add the one or more additional data instances of the plurality of data instances to the augmented training dataset.

In some non-limiting embodiments or aspects, when selecting the first plurality of supervised machine learning models, the at least one processor is programmed and/or configured to determine a measure of sensitivity of each supervised machine learning model of a group of supervised machine learning models to a time delay based on the augmented training dataset. The at least one processor is further programmed and/or configured to select a subset of the group of supervised machine learning models based on the measure of sensitivity of each supervised machine learning model to a time delay. In some non-limiting embodiments or aspects, when selecting the second plurality of unsupervised machine learning models, the at least one processor is programmed and/or configured to determine a measure of sensitivity of each unsupervised machine learning model of a group of unsupervised machine learning models to a time delay based on the augmented training dataset. The at least one processor is further programmed and/or configured to select a subset of the group of unsupervised machine learning models based on the measure of sensitivity of each unsupervised machine learning model to a time delay.

In some non-limiting embodiments or aspects, the measure of sensitivity of a supervised machine learning model to a time delay includes a measure of a change in accuracy of the supervised machine learning model with regard to the training dataset compared to the augmented training dataset. In some non-limiting embodiments or aspects, the measure of sensitivity of an unsupervised machine learning model to a time delay includes a measure of a change in accuracy of the unsupervised machine learning model with regard to the training dataset compared to the augmented training dataset.

According to some non-limiting embodiments or aspects, provided is a computer-implemented method for ensemble learning with machine learning models to prevent model performance degradation. The method includes receiving a training dataset of a plurality of data instances, wherein each data instance comprises a time series of data points. The method also includes adding an amount of time delay to one or more data instances of the plurality of data instances to provide an augmented training dataset. The method further includes selecting a first plurality of supervised machine learning models and selecting a second plurality of unsupervised machine learning models. The method further includes training the first plurality of supervised machine learning models and the second plurality of unsupervised machine learning models based on the augmented training dataset. The method further includes generating an ensemble machine learning model based on outputs of the first plurality of supervised machine learning models and outputs of the second plurality of unsupervised machine learning models. The method further includes generating a runtime output of the ensemble machine learning model based on a runtime input to the ensemble machine learning model.

In some non-limiting embodiments or aspects, adding the amount of time delay to one or more data instances of the plurality of data instances to provide the augmented training dataset includes adding the amount of time delay to a plurality of labeled data instances to provide a plurality of augmented labeled data instances. The method further includes adding the amount of time delay to a plurality of unlabeled data instances to provide a plurality of augmented unlabeled data instances. The augmented training dataset includes the plurality of augmented labeled data instances and the plurality of augmented unlabeled data instances.

In some non-limiting embodiments or aspects, the method further includes performing an action based on the runtime output of the ensemble machine learning model.

In some non-limiting embodiments or aspects, generating the ensemble machine learning model includes generating an output of the ensemble machine learning model based on the outputs of the first plurality of supervised machine learning models and the outputs of the second plurality of unsupervised machine learning models. The method further includes training the ensemble machine learning model using backpropagation based on the output of the ensemble machine learning model.

In some non-limiting embodiments or aspects, the method further includes adding a perturbation to one or more additional data instances of the plurality of data instances. The method further includes adding the one or more additional data instances of the plurality of data instances to the augmented training dataset.

In some non-limiting embodiments or aspects, selecting the first plurality of supervised machine learning models includes determining a measure of sensitivity of each supervised machine learning model of a group of supervised machine learning models to a time delay based on the augmented training dataset. The method also includes selecting a subset of the group of supervised machine learning models based on the measure of sensitivity of each supervised machine learning model to a time delay. In some non-limiting embodiments or aspects, selecting the second plurality of unsupervised machine learning models includes determining a measure of sensitivity of each unsupervised machine learning model of a group of unsupervised machine learning models to a time delay based on the augmented training dataset. The method also includes selecting a subset of the group of unsupervised machine learning models based on the measure of sensitivity of each unsupervised machine learning model to a time delay.

In some non-limiting embodiments or aspects, the measure of sensitivity of a supervised machine learning model to a time delay comprises a measure of a change in accuracy of the supervised machine learning model with regard to the training dataset compared to the augmented training dataset. In some non-limiting embodiments or aspects, the measure of sensitivity of an unsupervised machine learning model to a time delay comprises a measure of a change in accuracy of the unsupervised machine learning model with regard to the training dataset compared to the augmented training dataset.

According to some non-limiting embodiments or aspects, provided is a computer program product for ensemble learning with machine learning models to prevent model performance degradation. The computer program product includes at least one non-transitory computer-readable medium including one or more instructions that, when executed by at least one processor, cause the at least one processor to receive a training dataset of a plurality of data instances, wherein each data instance comprises a time series of data points. The one or more instructions also cause the at least one processor to add an amount of time delay to one or more data instances of the plurality of data instances to provide an augmented training dataset. The one or more instructions further cause the at least one processor to select a first plurality of supervised machine learning models and select a second plurality of unsupervised machine learning models. The one or more instructions further cause the at least one processor to train the first plurality of supervised machine learning models and the second plurality of unsupervised machine learning models based on the augmented training dataset. The one or more instructions further cause the at least one processor to generate an ensemble machine learning model based on outputs of the first plurality of supervised machine learning models and outputs of the second plurality of unsupervised machine learning models. The one or more instructions further cause the at least one processor to generate a runtime output of the ensemble machine learning model based on a runtime input to the ensemble machine learning model.

In some non-limiting embodiments or aspects, the one or more instructions that cause the at least one processor to add the amount of time delay to one or more data instances of the plurality of data instances cause the at least one processor to add the amount of time delay to a plurality of labeled data instances to provide a plurality of augmented labeled data instances. The one or more instructions further cause the at least one processor to add the amount of time delay to a plurality of unlabeled data instances to provide a plurality of augmented unlabeled data instances. In some non-limiting embodiments or aspects, the augmented training dataset comprises the plurality of augmented labeled data instances and the plurality of augmented unlabeled data instances.

In some non-limiting embodiments or aspects, the one or more instructions further cause the at least one processor to perform an action based on the runtime output of the ensemble machine learning model.

In some non-limiting embodiments or aspects, the one or more instructions that cause the at least one processor to generate the ensemble machine learning model cause the at least one processor to generate an output of the ensemble machine learning model based on the outputs of the first plurality of supervised machine learning models and the outputs of the second plurality of unsupervised machine learning models. The one or more instructions further cause the at least one processor to train the ensemble machine learning model using backpropagation based on the output of the ensemble machine learning model.

In some non-limiting embodiments or aspects, the one or more instructions further cause the at least one processor to add a perturbation to one or more additional data instances of the plurality of data instances. The one or more instructions further cause the at least one processor to add the one or more additional data instances of the plurality of data instances to the augmented training dataset.

In some non-limiting embodiments or aspects, the one or more instructions that cause the at least one processor to select the first plurality of supervised machine learning models cause the at least one processor to determine a measure of sensitivity of each supervised machine learning model of a group of supervised machine learning models to a time delay based on the augmented training dataset. The one or more instructions further cause the at least one processor to select a subset of the group of supervised machine learning models based on the measure of sensitivity of each supervised machine learning model to a time delay. In some non-limiting embodiments or aspects, the one or more instructions that cause the at least one processor to select the second plurality of unsupervised machine learning models cause the at least one processor to determine a measure of sensitivity of each unsupervised machine learning model of a group of unsupervised machine learning models to a time delay based on the augmented training dataset. The one or more instructions further cause the at least one processor to select a subset of the group of unsupervised machine learning models based on the measure of sensitivity of each unsupervised machine learning model to a time delay.

Further non-limiting embodiments or aspects are set forth in the following numbered clauses:

Clause 1: A system for ensemble learning with machine learning models to prevent model performance degradation, the system comprising: at least one processor programmed or configured to: receive a training dataset of a plurality of data instances, wherein each data instance comprises a time series of data points; add an amount of time delay to one or more data instances of the plurality of data instances to provide an augmented training dataset; select a first plurality of supervised machine learning models; select a second plurality of unsupervised machine learning models; train the first plurality of supervised machine learning models and the second plurality of unsupervised machine learning models based on the augmented training dataset; generate an ensemble machine learning model based on outputs of the first plurality of supervised machine learning models and outputs of the second plurality of unsupervised machine learning models; and generate a runtime output of the ensemble machine learning model based on a runtime input to the ensemble machine learning model.

Clause 2: The system of clause 1, wherein, when adding the amount of time delay to one or more data instances of the plurality of data instances to provide the augmented training dataset, the at least one processor is further programmed or configured to: add the amount of time delay to a plurality of labeled data instances to provide a plurality of augmented labeled data instances; and add the amount of time delay to a plurality of unlabeled data instances to provide a plurality of augmented unlabeled data instances; and wherein the augmented training dataset comprises the plurality of augmented labeled data instances and the plurality of augmented unlabeled data instances.

Clause 3: The system of clause 1 or 2, wherein the at least one processor is further programmed or configured to: perform an action based on the runtime output of the ensemble machine learning model.

Clause 4: The system of any of clauses 1-3, wherein when generating the ensemble machine learning model, the at least one processor is programmed or configured to: generate an output of the ensemble machine learning model based on the outputs of the first plurality of supervised machine learning models and the outputs of the second plurality of unsupervised machine learning models; and train the ensemble machine learning model using backpropagation based on the output of the ensemble machine learning model.

Clause 5: The system of any of clauses 1-4, wherein the at least one processor is further programmed or configured to: add a perturbation to one or more additional data instances of the plurality of data instances; and add the one or more additional data instances of the plurality of data instances to the augmented training dataset.

Clause 6: The system of any of clauses 1-5, wherein, when selecting the first plurality of supervised machine learning models, the at least one processor is programmed or configured to: determine a measure of sensitivity of each supervised machine learning model of a group of supervised machine learning models to a time delay based on the augmented training dataset; and select a subset of the group of supervised machine learning models based on the measure of sensitivity of each supervised machine learning model to a time delay; and wherein, when selecting the second plurality of unsupervised machine learning models, the at least one processor is programmed or configured to: determine a measure of sensitivity of each unsupervised machine learning model of a group of unsupervised machine learning models to a time delay based on the augmented training dataset; and select a subset of the group of unsupervised machine learning models based on the measure of sensitivity of each unsupervised machine learning model to a time delay.

Clause 7: The system of any of clauses 1-6, wherein the measure of sensitivity of a supervised machine learning model to a time delay comprises a measure of a change in accuracy of the supervised machine learning model with regard to the training dataset compared to the augmented training dataset; and wherein the measure of sensitivity of an unsupervised machine learning model to a time delay comprises a measure of a change in accuracy of the unsupervised machine learning model with regard to the training dataset compared to the augmented training dataset.

Clause 8: A method for ensemble learning with machine learning models to prevent model performance degradation, the method comprising: receiving, with at least one processor, a training dataset of a plurality of data instances, wherein each data instance comprises a time series of data points; adding, with at least one processor, an amount of time delay to one or more data instances of the plurality of data instances to provide an augmented training dataset; selecting, with at least one processor, a first plurality of supervised machine learning models; selecting, with at least one processor, a second plurality of unsupervised machine learning models; training, with at least one processor, the first plurality of supervised machine learning models and the second plurality of unsupervised machine learning models based on the augmented training dataset; generating, with at least one processor, an ensemble machine learning model based on outputs of the first plurality of supervised machine learning models and outputs of the second plurality of unsupervised machine learning models; and generating, with at least one processor, a runtime output of the ensemble machine learning model based on a runtime input to the ensemble machine learning model.

Clause 9: The method of clause 8, wherein adding the amount of time delay to one or more data instances of the plurality of data instances to provide the augmented training dataset comprises: adding the amount of time delay to a plurality of labeled data instances to provide a plurality of augmented labeled data instances; and adding the amount of time delay to a plurality of unlabeled data instances to provide a plurality of augmented unlabeled data instances; and wherein the augmented training dataset comprises the plurality of augmented labeled data instances and the plurality of augmented unlabeled data instances.

Clause 10: The method of clause 8 or 9 further comprising: performing an action based on the runtime output of the ensemble machine learning model.

Clause 11: The method of any of clauses 8-10, wherein generating the ensemble machine learning model comprises: generating an output of the ensemble machine learning model based on the outputs of the first plurality of supervised machine learning models and the outputs of the second plurality of unsupervised machine learning models; and training the ensemble machine learning model using backpropagation based on the output of the ensemble machine learning model.

Clause 12: The method of any of clauses 8-11 further comprising: adding a perturbation to one or more additional data instances of the plurality of data instances; and adding the one or more additional data instances of the plurality of data instances to the augmented training dataset.

Clause 13: The method of any of clauses 8-12, wherein selecting the first plurality of supervised machine learning models comprises: determining a measure of sensitivity of each supervised machine learning model of a group of supervised machine learning models to a time delay based on the augmented training dataset; and selecting a subset of the group of supervised machine learning models based on the measure of sensitivity of each supervised machine learning model to a time delay; and wherein selecting the second plurality of unsupervised machine learning models comprises: determining a measure of sensitivity of each unsupervised machine learning model of a group of unsupervised machine learning models to a time delay based on the augmented training dataset; and selecting a subset of the group of unsupervised machine learning models based on the measure of sensitivity of each unsupervised machine learning model to a time delay.

Clause 14: The method of any of clauses 8-13, wherein the measure of sensitivity of a supervised machine learning model to a time delay comprises a measure of a change in accuracy of the supervised machine learning model with regard to the training dataset compared to the augmented training dataset; and wherein the measure of sensitivity of an unsupervised machine learning model to a time delay comprises a measure of a change in accuracy of the unsupervised machine learning model with regard to the training dataset compared to the augmented training dataset.

Clause 15: A computer program product for ensemble learning with machine learning models to prevent model performance degradation, the computer program product comprising at least one non-transitory computer-readable medium including one or more instructions that, when executed by at least one processor, cause the at least one processor to: receive a training dataset of a plurality of data instances, wherein each data instance comprises a time series of data points; add an amount of time delay to one or more data instances of the plurality of data instances to provide an augmented training dataset; select a first plurality of supervised machine learning models; select a second plurality of unsupervised machine learning models; train the first plurality of supervised machine learning models and the second plurality of unsupervised machine learning models based on the augmented training dataset; generate an ensemble machine learning model based on outputs of the first plurality of supervised machine learning models and outputs of the second plurality of unsupervised machine learning models; and generate a runtime output of the ensemble machine learning model based on a runtime input to the ensemble machine learning model.

Clause 16: The computer program product of clause 15, wherein the one or more instructions that cause the at least one processor to add the amount of time delay to one or more data instances of the plurality of data instances cause the at least one processor to: add the amount of time delay to a plurality of labeled data instances to provide a plurality of augmented labeled data instances; and add the amount of time delay to a plurality of unlabeled data instances to provide a plurality of augmented unlabeled data instances; and wherein the augmented training dataset comprises the plurality of augmented labeled data instances and the plurality of augmented unlabeled data instances.

Clause 17: The computer program product of clause 15 or 16, wherein the one or more instructions further cause the at least one processor to: perform an action based on the runtime output of the ensemble machine learning model.

Clause 18: The computer program product of any of clauses 15-17, wherein the one or more instructions that cause the at least one processor to generate the ensemble machine learning model cause the at least one processor to: generate an output of the ensemble machine learning model based on the outputs of the first plurality of supervised machine learning models and the outputs of the second plurality of unsupervised machine learning models; and train the ensemble machine learning model using backpropagation based on the output of the ensemble machine learning model.

Clause 19: The computer program product of any of clauses 15-18, wherein the one or more instructions further cause the at least one processor to: add a perturbation to one or more additional data instances of the plurality of data instances; and add the one or more additional data instances of the plurality of data instances to the augmented training dataset.

Clause 20: The computer program product of any of clauses 15-19, wherein the one or more instructions that cause the at least one processor to select the first plurality of supervised machine learning models cause the at least one processor to: determine a measure of sensitivity of each supervised machine learning model of a group of supervised machine learning models to a time delay based on the augmented training dataset; and select a subset of the group of supervised machine learning models based on the measure of sensitivity of each supervised machine learning model to a time delay; and wherein the one or more instructions that cause the at least one processor to select the second plurality of unsupervised machine learning models cause the at least one processor to: determine a measure of sensitivity of each unsupervised machine learning model of a group of unsupervised machine learning models to a time delay based on the augmented training dataset; and select a subset of the group of unsupervised machine learning models based on the measure of sensitivity of each unsupervised machine learning model to a time delay.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the present disclosure. As used in the specification and the claims, the singular form of "a," "an," and "the" include plural referents unless the context clearly dictates otherwise.

BRIEF DESCRIPTION OF THE DRAWINGS

FIGS. 4A-4E are diagrams of non-limiting embodiments or aspects of an implementation of a process for generating a machine learning model based on an ensemble learning method using supervised and unsupervised techniques.

DETAILED DESCRIPTION

Figure 1:
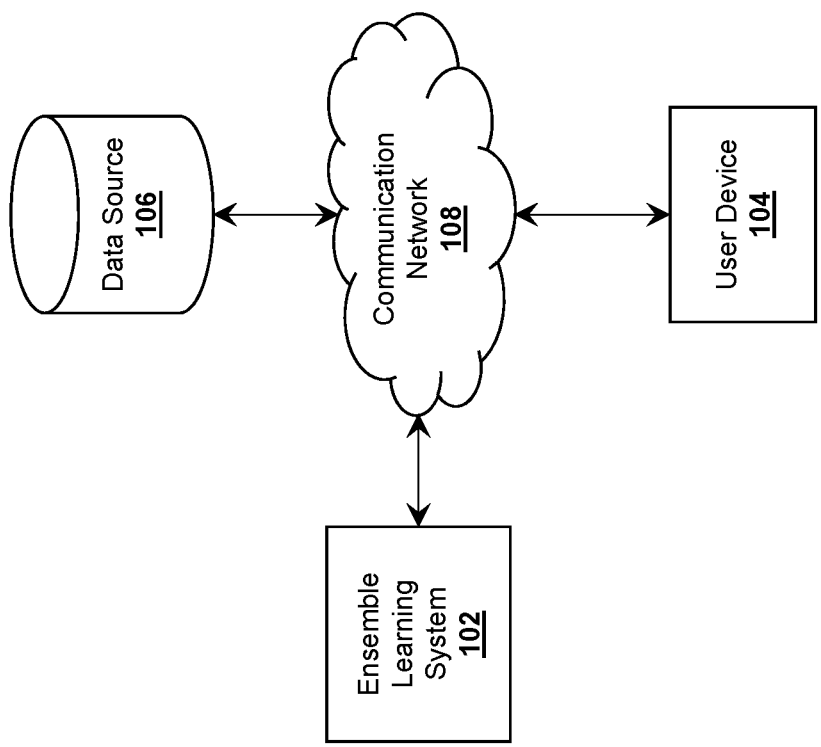
FIG. 1 is a diagram of a non-limiting embodiment or aspect of an environment in which systems, devices, products, apparatus, and/or methods, described herein, may be implemented according to the principles of the present disclosure.

For purposes of the description hereinafter, the terms "end," "upper," "lower," "right," "left," "vertical," "horizontal," "top," "bottom," "lateral," "longitudinal," and derivatives thereof shall relate to the disclosure as it is oriented in the drawing figures. However, it is to be understood that the disclosure may assume various alternative variations and step sequences, except where expressly specified to the contrary. It is also to be understood that the specific devices and processes illustrated in the attached drawings, and described in the following specification, are simply exemplary embodiments of the disclosure. Hence, specific dimensions and other physical characteristics related to the embodiments of the embodiments disclosed herein are not to be considered as limiting unless otherwise indicated.

No aspect, component, element, structure, act, step, function, instruction, and/or the like used herein should be construed as critical or essential unless explicitly described as such. In addition, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, etc.) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise. The phase "based on" may also mean "in response to" where appropriate.

As used herein, the terms "communication" and "communicate" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and transmits the processed information to the second unit. In some non-limiting embodiments, a message may refer to a network packet (e.g., a data packet and/or the like) that includes data.

As used herein, the terms "issuer," "issuer institution," "issuer bank," or "payment device issuer," may refer to one or more entities that provide accounts to individuals (e.g., users, customers, and/or the like) for conducting payment transactions, such as credit payment transactions and/or debit payment transactions. For example, an issuer institution may provide an account identifier, such as a primary account number (PAN), to a customer that uniquely identifies one or more accounts associated with that customer. In some non-limiting embodiments, an issuer may be associated with a bank identification number (BIN) that uniquely identifies the issuer institution. As used herein, the term "issuer system" may refer to one or more computer systems operated by or on behalf of an issuer, such as a server executing one or more software applications. For example, an issuer system may include one or more authorization servers for authorizing a transaction.

As used herein, the term "transaction service provider" may refer to an entity that receives transaction authorization requests from merchants or other entities and provides guarantees of payment, in some cases through an agreement between the transaction service provider and an issuer institution. For example, a transaction service provider may include a payment network, such as Visa®, MasterCard®, American Express®, or any other entity that processes transactions. As used herein, the term "transaction service provider system" may refer to one or more computer systems operated by or on behalf of a transaction service provider, such as a transaction service provider system executing one or more software applications. A transaction service provider system may include one or more processors and, in some non-limiting embodiments, may be operated by or on behalf of a transaction service provider.

As used herein, the term "merchant" may refer to one or more entities (e.g., operators of retail businesses) that provide goods and/or services, and/or access to goods and/or services, to a user (e.g., a customer, a consumer, and/or the like) based on a transaction, such as a payment transaction. As used herein, the term "merchant system" may refer to one or more computer systems operated by or on behalf of a merchant, such as a server executing one or more software applications. As used herein, the term "product" may refer to one or more goods and/or services offered by a merchant.

As used herein, the term "acquirer" may refer to an entity licensed by the transaction service provider and approved by the transaction service provider to originate transactions (e.g., payment transactions) involving a payment device associated with the transaction service provider. As used herein, the term "acquirer system" may also refer to one or more computer systems, computer devices, and/or the like operated by or on behalf of an acquirer. The transactions the acquirer may originate may include payment transactions (e.g., purchases, original credit transactions (OCTs), account funding transactions (AFTs), and/or the like). In some non-limiting embodiments, the acquirer may be authorized by the transaction service provider to assign merchant or service providers to originate transactions involving a payment device associated with the transaction service provider. The acquirer may contract with payment facilitators to enable the payment facilitators to sponsor merchants. The acquirer may monitor compliance of the payment facilitators in accordance with regulations of the transaction service provider. The acquirer may conduct due diligence of the payment facilitators and ensure proper due diligence occurs before signing a sponsored merchant. The acquirer may be liable for all transaction service provider programs that the acquirer operates or sponsors. The acquirer may be responsible for the acts of the acquirer's payment facilitators, merchants that are sponsored by the acquirer's payment facilitators, and/or the like. In some non-limiting embodiments, an acquirer may be a financial institution, such as a bank.

As used herein, the term "payment gateway" may refer to an entity and/or a payment processing system operated by or on behalf of such an entity (e.g., a merchant service provider, a payment service provider, a payment facilitator, a payment facilitator that contracts with an acquirer, a payment aggregator, and/or the like), which provides payment services (e.g., transaction service provider payment services, payment processing services, and/or the like) to one or more merchants. The payment services may be associated with the use of portable financial devices managed by a transaction service provider. As used herein, the term "payment gateway system" may refer to one or more computer systems, computer devices, servers, groups of servers, and/or the like operated by or on behalf of a payment gateway.

As used herein, the terms "client" and "client device" may refer to one or more computing devices, such as processors, storage devices, and/or similar computer components, that access a service made available by a server. In some non-limiting embodiments, a client device may include a computing device configured to communicate with one or more networks and/or facilitate transactions such as, but not limited to, one or more desktop computers, one or more portable computers (e.g., tablet computers), one or more mobile devices (e.g., cellular phones, smartphones, personal digital assistant, wearable devices, such as watches, glasses, lenses, and/or clothing, and/or the like), and/or other like devices. Moreover, the term "client" may also refer to an entity that owns, utilizes, and/or operates a client device for facilitating transactions with another entity.

As used herein, the term "server" may refer to one or more computing devices, such as processors, storage devices, and/or similar computer components that communicate with client devices and/or other computing devices over a network, such as the Internet or private networks and, in some examples, facilitate communication among other servers and/or client devices.

As used herein, the term "system" may refer to one or more computing devices or combinations of computing devices such as, but not limited to, processors, servers, client devices, software applications, and/or other like components. In addition, reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

Provided are systems, methods, and computer program products for generating a machine learning model based on an ensemble learning method using supervised and unsupervised techniques. Embodiments of the present disclosure may include a system for ensemble learning with machine learning models to prevent model performance degradation, the system comprising at least one processor programmed or configured to receive a training dataset of a plurality of data instances, wherein each data instance comprises a time series of data points; add an amount of time delay to one or more data instances of the plurality of data instances to provide an augmented training dataset; select a first plurality of supervised machine learning models; select a second plurality of unsupervised machine learning models; train the first plurality of supervised machine learning models and the second plurality of unsupervised machine learning models based on the augmented training dataset; generate an ensemble machine learning model based on outputs of the first plurality of supervised machine learning models and outputs of the second plurality of unsupervised machine learning models; and generate a runtime output of the ensemble machine learning model based on a runtime input to the ensemble machine learning model.

In some non-limiting embodiments or aspects, when adding the amount of time delay to one or more data instances of the plurality of data instances to provide the augmented training dataset, the at least one processor is further programmed and/or configured to add the amount of time delay to a plurality of labeled data instances to provide a plurality of augmented labeled data instances. The at least one processor is further programmed and/or configured to add the amount of time delay to a plurality of unlabeled data instances to provide a plurality of augmented unlabeled data instances. The augmented training dataset includes the plurality of augmented labeled data instances and the plurality of augmented unlabeled data instances.

In some non-limiting embodiments or aspects, the at least one processor is further programmed and/or configured to perform an action based on the runtime output of the ensemble machine learning model. In some non-limiting embodiments or aspects, when generating the ensemble machine learning model, the at least one processor is programmed and/or configured to generate an output of the ensemble machine learning model based on the outputs of the first plurality of supervised machine learning models and the outputs of the second plurality of unsupervised machine learning models. The at least one processor is further programmed and/or configured to train the ensemble machine learning model using backpropagation based on the output of the ensemble machine learning model. In some non-limiting embodiments or aspects, the at least one processor is further programmed and/or configured to add a perturbation to one or more additional data instances of the plurality of data instances. The at least one processor is further programmed and/or configured to add the one or more additional data instances of the plurality of data instances to the augmented training dataset.

In some non-limiting embodiments or aspects, when selecting the first plurality of supervised machine learning models, the at least one processor is programmed and/or configured to determine a measure of sensitivity of each supervised machine learning model of a group of supervised machine learning models to a time delay based on the augmented training dataset. The at least one processor is further programmed and/or configured to select a subset of the group of supervised machine learning models based on the measure of sensitivity of each supervised machine learning model to a time delay. In some non-limiting embodiments or aspects, when selecting the second plurality of unsupervised machine learning models, the at least one processor is programmed and/or configured to determine a measure of sensitivity of each unsupervised machine learning model of a group of unsupervised machine learning models to a time delay based on the augmented training dataset. The at least one processor is further programmed and/or configured to select a subset of the group of unsupervised machine learning models based on the measure of sensitivity of each unsupervised machine learning model to a time delay. In some non-limiting embodiments or aspects, the measure of sensitivity of a supervised machine learning model to a time delay includes a measure of a change in accuracy of the supervised machine learning model with regard to the training dataset compared to the augmented training dataset. In some non-limiting embodiments or aspects, the measure of sensitivity of an unsupervised machine learning model to a time delay includes a measure of a change in accuracy of the unsupervised machine learning model with regard to the training dataset compared to the augmented training dataset.

In this way, embodiments or aspects of the present disclosure generate a machine learning model with increased accuracy and reduced model degradation over time by combining supervised learning and unsupervised learning such that model freshness is preserved. The ensemble learning system may use data including data delay to build robust and accurate deep learning models. In some non-limiting embodiments or aspects, model degradation may be reduced or eliminated when new patterns in the model input data emerge due to sudden changes in the market or technology (e.g., technological changes, domain changes, market changes, and/or the like). In some non-limiting embodiments or aspects, machine learning models may include a diverse set of base models and multiple clustering models to preserve model freshness and generalization. In some non-limiting embodiments or aspects, data delay may be generated to preserve model freshness, reduce degradation, improve model resilience to changes in data and/or data delay, and improve the model's accuracy over time.

Referring now to FIG. 1, FIG. 1 is a diagram of an example environment 100 in which devices, systems, methods, and/or products described herein may be implemented. As shown in FIG. 1, environment 100 includes ensemble learning system 102, user device 104, data source 106, and communication network 108. Ensemble learning system 102, user device 104, and data source 106 may interconnect (e.g., establish a connection to communicate, and/or the like)

via wired connections, wireless connections, or a combination of wired and wireless connections.

Ensemble learning system 102 may include one or more computing devices configured to communicate with user device 104, and/or data source 106 via communication network 108. For example, ensemble learning system 102 may include a group of servers and/or other like devices. In some non-limiting embodiments or aspects, ensemble learning system 102 may be associated with (e.g., operated by) a transaction service provider, as described herein. Additionally or alternatively, ensemble learning system 102 may be a component of a transaction service provider system, an issuer system, and/or a merchant system. In some non-limiting embodiments or aspects, ensemble learning system 102 may include one or more machine learning models. The machine learning models may be trained using unsupervised and/or supervised methods. In some non-limiting embodiments or aspects, the machine learning models may be trained using datasets from data source 106. In some non-limiting embodiments or aspects, output from one machine learning model may be used as input for training other machine learning models.

User device 104 may include one or more computing devices configured to communicate with ensemble learning system 102 and/or data source 106 via communication network 108. For example, user device 104 may include a desktop computer (e.g., a client device that communicates with a server), a mobile device, and/or the like. In some non-limiting embodiments or aspects, user device 104 may be associated with a user (e.g., an individual operating a device).

Data source 106 may include one or more datasets used for training one or more machine learning models. In some non-limiting embodiments or aspects, data source 106 may include one or more static training datasets and/or one or more real time training datasets. For example, data source 106 may include real time training datasets which may be constantly updated with new data. In some non-limiting embodiments or aspects, data source 106 may include static training datasets which have been previously compiled and stored in data source 106. In this way, static training datasets may not receive new data. Data source 106 may be updated via communication network 108. Data source 106 may be configured to communicate with ensemble learning system 102 and/or user device 104 via communication network 108. In some non-limiting embodiments or aspects, data source 106 may be updated with new data from one or more machine learning models. For example, output from one or more machine learning models may be communicated to data source 106 for storage. In some non-limiting embodiments or aspects, output from one or more machine learning models stored in data source 106 may be used as input to one or more other machine learning models for future training.

Communication network 108 may include one or more wired and/or wireless networks. For example, communication network 108 may include a cellular network (e.g., a long-term evolution (LTE) network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN)), a private network, an ad hoc network, an intranet, the Internet, a fiber optic-based network, a cloud computing network, and/or the like, and/or a combination of some or all of these or other types of networks.

The number and arrangement of systems and/or devices shown in FIG. 1 are provided as an example. There may be additional systems and/or devices, fewer systems and/or devices, different systems and/or devices, or differently arranged systems and/or devices than those shown in FIG. 1. Furthermore, two or more systems and/or devices shown in FIG. 1 may be implemented within a single system or a single device, or a single system or a single device shown in FIG. 1 may be implemented as multiple, distributed systems or devices. Additionally or alternatively, a set of systems or a set of devices (e.g., one or more systems, one or more devices) of environment 100 may perform one or more functions described as being performed by another set of systems or another set of devices of environment 100.

Figure 2:
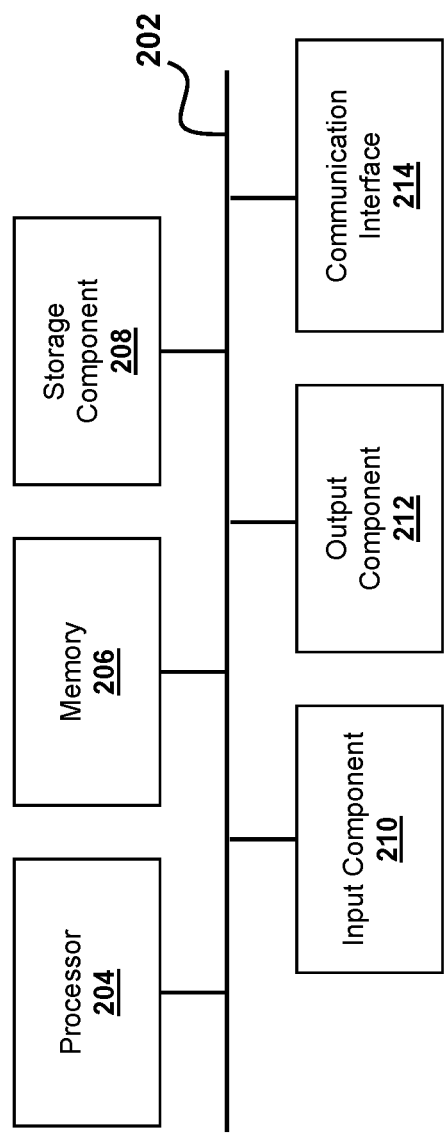
FIG. 2 is a diagram of a non-limiting embodiment or aspect of components of one or more devices and/or one or more systems of FIG. 1.

Referring now to FIG. 2, FIG. 2 is a diagram of example components of device 200. Device 200 may correspond to ensemble learning system 102 (e.g., one or more devices of ensemble learning system 102), user device 104, and/or data source 106. In some non-limiting embodiments or aspects, ensemble learning system 102, user device 104, and/or data source 106 may include at least one device 200. As shown in FIG. 2, device 200 may include bus 202, processor 204, memory 206, storage component 208, input component 210, output component 212, and communication interface 214.

Bus 202 may include a component that permits communication among the components of device 200. In some non-limiting embodiments or aspects, processor 204 may be implemented in hardware, software, or a combination of hardware and software. For example, processor 204 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 206 may include random access memory (RAM), read-only memory (ROM), and/or another type of dynamic or static storage device (e.g., flash memory, magnetic memory, optical memory, etc.) that stores information and/or instructions for use by processor 204.

Storage component 208 may store information and/or software related to the operation and use of device 200. For example, storage component 208 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive. In some non-limiting embodiments or aspects, storage component 208 may correspond to data source 106.

Input component 210 may include a component that permits device 200 to receive information, such as via user input (e.g., a touchscreen display, a keyboard, a keypad, a mouse, a button, a switch, a microphone, a camera, etc.). Additionally or alternatively, input component 210 may include a sensor for sensing information (e.g., a global positioning system (GPS) component, an accelerometer, a gyroscope, an actuator, etc.). Output component 212 may include a component that provides output information from device 200 (e.g., a display, a speaker, one or more light-emitting diodes (LEDs), etc.).

Communication interface 214 may include a transceiver-like component (e.g., a transceiver, a separate receiver and transmitter, etc.) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a Wi-Fi® interface, a Bluetooth® interface, a Zigbee® interface, a cellular network interface, and/or the like.

Device 200 may perform one or more processes described herein. Device 200 may perform these processes based on processor 204 executing software instructions stored by a computer-readable medium, such as memory 206 and/or storage component 208. A computer-readable medium (e.g., a non-transitory computer-readable medium) is defined herein as a non-transitory memory device. A non-transitory memory device includes memory space located inside of a single physical storage device or memory space spread across multiple physical storage devices.

Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally or alternatively, hardwired circuitry may be used in place of or in combination with software instructions to perform one or more processes described herein. Thus, embodiments described herein are not limited to any specific combination of hardware circuitry and software.

Memory 206 and/or storage component 208 may include data storage or one or more data structures (e.g., a database and/or the like). Device 200 may be capable of receiving information from, storing information in, communicating information to, or searching information stored in the data storage or one or more data structures in memory 206 and/or storage component 208. For example, the information may include input data, output data, transaction data, account data, or any combination thereof.

The number and arrangement of components shown in FIG. 2 are provided as an example. In some non-limiting embodiments or aspects, device 200 may include additional components, fewer components, different components, or differently arranged components than those shown in FIG. 2. Additionally or alternatively, a set of components (e.g., one or more components) of device 200 may perform one or more functions described as being performed by another set of components of device 200.

Figure 3:
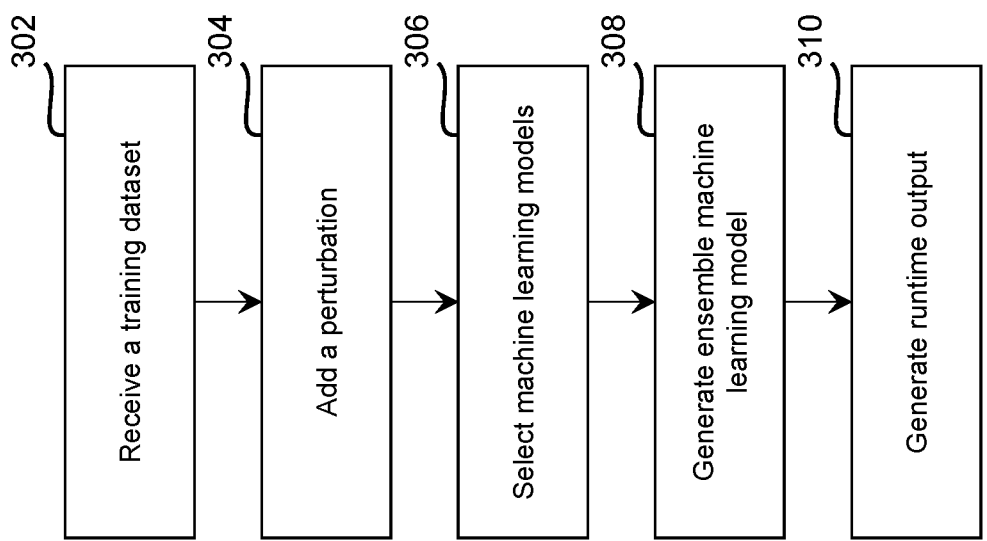
FIG. 3 is a flowchart of a non-limiting embodiment or aspect of a process for generating a machine learning model based on an ensemble learning method using supervised and unsupervised techniques.

Referring now to FIG. 3, FIG. 3 is a flowchart of a non-limiting embodiment or aspect of a process 300 for generating a machine learning model based on an ensemble learning method using supervised and unsupervised techniques. In some non-limiting embodiments or aspects, one or more of the functions described with respect to process 300 may be performed (e.g., completely, partially, etc.) by ensemble learning system 102. In some non-limiting embodiments or aspects, one or more of the steps of process 300 may be performed (e.g., completely, partially, and/or the like) by another device or a group of devices separate from or including ensemble learning system 102, such as user device 104.

As shown in FIG. 3, at step 302, process 300 may include receiving a training dataset. In some non-limiting embodiments or aspects, ensemble learning system 102 may receive a training dataset of a plurality of data instances, wherein each data instance comprises a time series of data points. For example, ensemble learning system 102 may receive a real time and/or static training dataset from data source 106 for training one or more machine learning models. In some non-limiting embodiments or aspects, a static training dataset may include a predefined training dataset which is stored in a storage component and/or stored in data source 106. In some non-limiting embodiments or aspects, ensemble learning system 102 may receive a training dataset in real time as a time sequenced dataset as the data is being collected. In some non-limiting embodiments or aspects, ensemble learning system 102 may receive a training dataset corresponding to output from one or more machine learning models.

In some non-limiting embodiments or aspects, each data instance of the plurality of data instances of the training dataset may represent an event, such as an electronic payment transaction (e.g., an electronic credit card payment transaction, an electronic debit card payment transaction, etc.) between a user associated with user device 104 and a merchant associated with a merchant system. In some non-limiting embodiments or aspects, each data instance may be received in real time with respect to the event. In some non-limiting embodiments or aspects, each data instance may be stored and compiled into a training dataset for future training. In some non-limiting embodiments or aspects, each data instance may include transaction data associated with the electronic payment transaction. In some non-limiting embodiments or aspects, transaction data may include transaction parameters associated with an electronic payment transaction. Transaction parameters may include electronic wallet card data associated with an electronic card (e.g., an electronic credit card, an electronic debit card, an electronic loyalty card, and/or the like), decision data associated with a decision (e.g., a decision to approve or deny a transaction authorization request), authorization data associated with an authorization response (e.g., an approved spending limit, an approved transaction value, and/or the like), a PAN, an authorization code (e.g., a PIN, etc.), data associated with a transaction amount (e.g., an approved limit, a transaction value, etc.), data associated with a transaction date and time, data associated with a conversion rate of a currency, data associated with a merchant type (e.g., goods, grocery, fuel, and/or the like), data associated with an acquiring institution country, data associated with an identifier of a country associated with the PAN, data associated with a response code, data associated with a merchant identifier (e.g., a merchant name, a merchant location, and/or the like), data associated with a type of currency corresponding to funds stored in association with the PAN, and/or the like.

In some non-limiting embodiments or aspects, the predicted classification values may include an amount of time associated with the event. For example, the predicted classification values may represent an amount of time taken to complete the event. In one example, the predicted classification values may represent an amount of time (e.g., a number of days) taken to clear (e.g., a process that involves activities that turn the promise of payment, such as in the form of an electronic payment request, into an actual movement of electronic funds from one account to another) an electronic payment transaction between a user associated with user device 104 and a merchant associated with a merchant system.

In some non-limiting embodiments or aspects, ensemble learning system 102 may generate the training dataset based on outputs of one or more trained machine learning model. For example, ensemble learning system 102 may provide each data instance of the dataset as input to the trained machine learning model, and ensemble learning system 102 may generate an output of the trained machine learning model for each data instance of the dataset as an input.

In some non-limiting embodiments or aspects, ensemble learning system 102 may determine a classification (e.g., a predicted classification, an initial predicted classification, and/or the like) of each data instance of the dataset. For example, ensemble learning system 102 may determine the classification of the initial input by providing the initial input to one or more trained machine learning models (e.g., a trained machine learning model that includes a random forest, a multilayer perceptron, and/or a neural network, such as a deep neural network) and determine the classification as an output from the machine learning models. In some non-limiting embodiments or aspects, one or more of the trained machine learning models may be a machine learning classifier that includes a deep learning network. In some non-limiting embodiments or aspects, the classification may be associated with a class that includes a group of members, and the classification may refer to a characteristic that is shared among the members of the group in the class. In some non-limiting embodiments or aspects, ensemble learning system 102 may store the training dataset in a database.

In some non-limiting embodiments or aspects, each value of the plurality of values associated with the prediction matrix may include a value representing an error value between a predicted classification value (e.g., an amount of time, such as a number of days) for one or more data instances and a ground truth value for the one or more data instances. The values of the prediction matrix may include an error value between a first ground truth value for one or more data instances and a first predicted classification value for the one or more data instances, an error value between a second ground truth value for one or more data instances and the first predicted classification value for the one or more data instances, an error value between the first ground truth value for one or more data instances and a second predicted classification value for the one or more data instances, an error value between a third ground truth value for one or more data instances and the first predicted classification value for the one or more data instances, an error value between the first ground truth value for one or more data instances and a third predicted classification value for the one or more data instances, an error value between the third ground truth value for one or more data instances and the second predicted classification value for the one or more data instances, an error value between the second ground truth value for one or more data instances and the third predicted classification value for the one or more data instances, and so on. In some non-limiting embodiments or aspects, the plurality of values associated with the prediction matrix may include upper error values (e.g., upper diagonal error values) for a plurality of events and lower error values (e.g., lower diagonal error values) for the plurality of events. In some non-limiting embodiments or aspects, the upper error values comprise error values associated with the predicted classification value for the event being greater than the ground truth value for the event. In some non-limiting embodiments or aspects, the lower error values may include error values associated with the predicted classification value for the event being less than the ground truth value for the event. In some non-limiting embodiments or aspects, the plurality of values associated with the prediction matrix may include correct prediction values, which may include values associated with the predicted classification value for the event being equal to the ground truth value for the event.

In some non-limiting embodiments or aspects, ensemble learning system 102 may generate one or more trained machine learning model. For example, ensemble learning system 102 may generate a trained machine learning model to provide a predicted classification of a data instance, such as a data instance associated with an event, based on the training dataset.

In some non-limiting embodiments or aspects, the one or more trained machine learning model may include a machine learning model designed to receive, as an input, data instances associated with events, and provide, as an output, a predicted classification of the data instances. In some non-limiting embodiments or aspects, ensemble learning system 102 may store the trained machine learning model (e.g., for later use).

In some non-limiting embodiments or aspects, as described herein, ensemble learning system 102 may process data instances associated with events (e.g., historical data instances associated with events) to obtain training data (e.g., a training dataset) for the machine learning model. For example, ensemble learning system 102 may process the data to change the data into a format that may be analyzed (e.g., by ensemble learning system 102) to generate one or more trained machine learning model. The data that is changed (e.g., the data that results from the change) may be referred to as training data. In some non-limiting embodiments or aspects, ensemble learning system 102 may process the data instances associated with events to obtain the training data based on receiving the data instances. Additionally or alternatively, ensemble learning system 102 may process the data to obtain the training data based on ensemble learning system 102 receiving an indication, from a user (e.g., a user associated with user device 104) of ensemble learning system 102, that ensemble learning system 102 is to process the data, such as when ensemble learning system 102 receives an indication to generate a machine learning model for predicting a classification of an event.

In some non-limiting embodiments or aspects, ensemble learning system 102 may process data instances associated with events by determining a prediction variable based on the data. A prediction variable may include a metric, associated with events, which may be derived based on the data instances associated with events. The prediction variable may be analyzed to generate a trained machine learning model. For example, the prediction variable may include a variable associated with a time of an event, a variable associated with a parameter of an event, a variable associated with a number of occurrences of an aspect of an event, and/or the like.

In some non-limiting embodiments or aspects, ensemble learning system 102 may analyze the training data to generate one or more trained machine learning model. For example, ensemble learning system 102 may use machine learning techniques to analyze the training data to generate a trained machine learning model. In some non-limiting embodiments or aspects, generating a trained machine learning model (e.g., based on training data) may be referred to as training a machine learning model. The machine learning techniques may include, for example, supervised and/or unsupervised techniques, such as decision trees, random forests, logistic regressions, linear regression, gradient boosting, support-vector machines, extra-trees (e.g., an extension of random forests), Bayesian statistics, learning automata, Hidden Markov Modeling, linear classifiers, quadratic classifiers, association rule learning, and/or the like. In some non-limiting embodiments or aspects, the machine learning model may include a model that is specific to a particular characteristic, for example, a model that is specific to a particular entity involved in an event, a particular time interval during which an event occurred, and/or the like. Additionally or alternatively, the machine learning model may be specific to particular entities (e.g., business entities, such as merchants, consumer entities, such as account holders of accounts issued by issuers, issuers, etc.) that are involved in the events. In some non-limiting embodiments or aspects, ensemble learning system 102 may generate one or more trained machine learning models for one or more entities, a particular group of entities, and/or one or more users of one or more entities.

Additionally or alternatively, when analyzing the training data, ensemble learning system 102 may identify one or more variables (e.g., one or more independent variables) as predictor variables (e.g., features) that may be used to make a prediction when analyzing the training data. In some non-limiting embodiments or aspects, values of the predictor variables may be inputs to a machine learning model. For example, ensemble learning system 102 may identify a subset (e.g., a proper subset) of the variables as the predictor variables that may be used to accurately predict a classification of an event. In some non-limiting embodiments or aspects, the predictor variables may include one or more of the prediction variables, as discussed above, that have a significant impact (e.g., an impact satisfying a threshold) on a predicted classification of an event as determined by ensemble learning system 102.

In some non-limiting embodiments or aspects, ensemble learning system 102 may validate a machine learning model. For example, ensemble learning system 102 may validate the machine learning model after ensemble learning system 102 generates the machine learning model. In some non-limiting embodiments or aspects, ensemble learning system 102 may validate the machine learning model based on a portion of the training data to be used for validation. For example, ensemble learning system 102 may partition the training data into a first portion and a second portion, where the first portion may be used to generate a machine learning model, as described above.

In some non-limiting embodiments or aspects, ensemble learning system 102 may validate the machine learning model by providing validation data associated with a user (e.g., data associated with one or more events involving a user) as input to the machine learning model, and determining, based on an output of the machine learning model, whether the machine learning model correctly, or incorrectly, predicted a classification of an event. In some non-limiting embodiments or aspects, ensemble learning system 102 may validate the machine learning model based on a validation threshold. For example, ensemble learning system 102 may be configured to validate the machine learning model when the classifications of a plurality of events (as identified by the validation data) are correctly predicted by the machine learning model (e.g., when the machine learning model correctly predicts 50% of the classifications of a plurality of events, 70% of the classifications of a plurality of events, a threshold quantity of the classifications of a plurality of events, and/or the like).

In some non-limiting embodiments or aspects, if ensemble learning system 102 does not validate the machine learning model (e.g., when a percentage of correctly predicted classifications of a plurality of events does not satisfy the validation threshold), then ensemble learning system 102 may generate one or more additional machine learning models.

In some non-limiting embodiments or aspects, once the machine learning model has been validated, ensemble learning system 102 may further train the machine learning model and/or generate new machine learning models based on receiving new training data. The new training data may include additional data associated with one or more events. In some non-limiting embodiments or aspects, the new training data may include data associated with an additional plurality of events. Ensemble learning system 102 may use the machine learning model to predict the classifications of the additional plurality of events and compare an output of a machine learning model to the new training data. In such an example, ensemble learning system 102 may update one or more trained machine learning models based on the new training data.

In some non-limiting embodiments or aspects, ensemble learning system 102 may store the trained machine learning model. For example, ensemble learning system 102 may store the trained machine learning model in a data structure (e.g., a database, a linked list, a tree, and/or the like). The data structure may be located within ensemble learning system 102 or external (e.g., remote from) ensemble learning system 102.

As shown in FIG. 3, at step 304, process 300 may include adding a perturbation. In some non-limiting embodiments or aspects, ensemble learning system 102 may add a perturbation to one or more data instances of the plurality of data instances to provide an augmented training dataset. In some non-limiting embodiments or aspects, ensemble learning system 102 may add an amount of time delay to one or more data instances of the plurality of data instances to provide an augmented training dataset. For example, ensemble learning system 102 may add a time delay to one or more data instances of the plurality of data instances by inserting new and/or preexisting data instances into the plurality of data instances at specified time intervals. Additionally or alternatively, the time intervals for inserting new and/or preexisting data instances into the plurality of data instances may be random. In some non-limiting embodiments or aspects, ensemble learning system 102 may add a time delay to one or more data instances of the plurality of data instances by removing data instances from the plurality of data instances at specified time intervals. Additionally or alternatively, the time intervals for removing data instances from the plurality of data instances may be random. In some non-limiting embodiments or aspects, a time delay may be generated continuously within the plurality of data instances. Additionally or alternatively, a time delay may be generated at specific intervals, from a time equal to 0 to a selected upper bound.

In some non-limiting embodiments or aspects, ensemble learning system 102 may add a time delay to one or more data instances of the plurality of data instances by comparing a current real time to a predetermined time of an event associated with a data instance. In some non-limiting embodiments or aspects, a current real time may include the time measured at the instant an action is performed (e.g., when the time delay is added, when the model is trained on a training dataset, when the model reads a data instance, etc.). In some non-limiting embodiments or aspects, ensemble learning system 102 may add a perturbation to one or more additional data instances of the plurality of data instances. In some non-limiting embodiments or aspects, ensemble learning system 102 may add the one or more additional data instances of the plurality of data instances to the augmented training dataset. In some non-limiting embodiments or aspects, a perturbation may include small changes added to one or more data instances in the plurality of data instances (e.g., adding noise, data deformations, new data sequences, etc.). In some non-limiting embodiments or aspects, ensemble learning system 102 may add a perturbation to one or more data instances using adversarial training techniques (e.g., poisoning, fast gradient sign method, visual similarity, semantic similarity, and/or the like).

As shown in FIG. 3, at step 306, process 300 may include selecting machine learning models. In some non-limiting embodiments or aspects, ensemble learning system 102 may select a first plurality of supervised machine learning models. For example, ensemble learning system 102 may select a first plurality of trained and/or untrained supervised machine learning models based on the classification output of the plurality of supervised models. In some non-limiting embodiments or aspects, the output of a trained machine learning model may include a predicted classification value for an event, such as a real time event, that is provided as an input. In some non-limiting embodiments or aspects, the output of a trained supervised machine learning model may include a predicted classification value for the event, where that event is not an event associated with the data instance of the dataset used to train the trained supervised machine learning model.

In some non-limiting embodiments or aspects, ensemble learning system 102 may select the first plurality of supervised machine learning models by determining a measure of sensitivity of each supervised machine learning model of a group of supervised machine learning models to a perturbation, such as a time delay, based on the augmented training dataset. In some non-limiting embodiments or aspects, ensemble learning system 102 may select a subset of the group of supervised machine learning models based on the measure of sensitivity of each supervised machine learning model to a time delay. In some non-limiting embodiments or aspects, the measure of sensitivity of a machine learning model (e.g., a supervised machine learning model or an unsupervised machine learning model) to a time delay may include a measure of a change in accuracy of the machine learning model with regard to the training dataset compared to the augmented training dataset.

In some non-limiting embodiments or aspects, ensemble learning system 102 may use the first plurality of supervised machine learning models for ensemble learning. In some non-limiting embodiments or aspects, ensemble learning with ensemble learning system 102 using the first plurality of supervised machine learning models may be based on a Bayes optimal classifier, Boosting, Bayesian model averaging, bucket of models, and/or the like. Additionally or alternatively, ensemble learning using the first plurality of supervised machine learning models may be based on stacking a plurality of machine learning models where one or more machine learning models use the output of other machine learning models as input for training.

In some non-limiting embodiments or aspects, ensemble learning may include a machine learning process of training one or more machine learning models (e.g., a trained machine learning model that includes a random forest, a multilayer perceptron, and/or a neural network, such as a deep neural network) using the output from two or more machine learning models, which were individually trained using the same training dataset as input to the one or more machine learning models (e.g., the one or more machine learning models being trained). In some non-limiting embodiments or aspects, an algorithm may be used for training a machine learning model during an ensemble learning process. For example, the algorithm used during the ensemble learning process may include weighted average, stacked generalization (e.g., stacking), bootstrap aggregation (e.g., bagging), boosting, and/or the like.

In some non-limiting embodiments or aspects, ensemble learning system 102 may receive the data associated with a training dataset, and ensemble learning system 102 may provide the data associated with a training dataset as the input to one or more trained machine learning model. Ensemble learning system 102 may generate the output from one or more trained machine learning model based on the input. In some non-limiting embodiments or aspects, the output from the trained supervised machine learning model may include a plurality of predicted classification values. The plurality of predicted classification values may include a predicted classification value for each classification (e.g., each class label) for which the trained machine learning model is configured to provide a prediction.

In some non-limiting embodiments or aspects, ensemble learning system 102 may select a second plurality of unsupervised machine learning models. For example, ensemble learning system 102 may select a second plurality of trained and/or untrained unsupervised machine learning models based on the output of data clusters of the plurality of unsupervised models. In some non-limiting embodiments or aspects, the output of one or more trained unsupervised machine learning model may include a predicted clustering value for an event and/or data instance, such as a real time event and/or data instance, that is provided as an input. In some non-limiting embodiments or aspects, the output of one or more trained unsupervised machine learning model may include a predicted classification value for the event, where that event is not an event associated with the data instance of the dataset used to train one or more unsupervised machine learning model.

In some non-limiting embodiments or aspects, ensemble learning system 102 may select a second plurality of unsupervised machine learning models by determining a measure of sensitivity of each unsupervised machine learning model of a group of unsupervised machine learning models to a time delay based on the augmented training dataset. Ensemble learning system 102 may select a subset of the group of unsupervised machine learning models based on the measure of sensitivity of each unsupervised machine learning model to a time delay.

In some non-limiting embodiments or aspects, ensemble learning system 102 may use the second plurality of unsupervised machine learning models for ensemble learning. Ensemble learning with ensemble learning system 102 using the second plurality of unsupervised machine learning models may be based on a clustering model (e.g., combined clustering models, co-association, meta-clustering, exclusive clustering, and/or the like).

In some non-limiting embodiments or aspects, ensemble learning system 102 may receive the plurality of data instances associated with a training dataset, and ensemble learning system 102 may provide the plurality of data instances associated with a training dataset as the input to one or more trained machine learning models. Ensemble learning system 102 may generate the output from one or more trained machine learning model based on the input. In some non-limiting embodiments or aspects, the output from one or more trained unsupervised machine learning model may include a plurality of clustering values. The plurality of clustering values may include a centroid value for each cluster (e.g., k centers in k-means clustering) for which the trained machine learning model is configured to provide a prediction of clustered data.

In some non-limiting embodiments or aspects, ensemble learning system 102 may train the first plurality of supervised machine learning models and the second plurality of unsupervised machine learning models based on the augmented training dataset. For example, ensemble learning system 102 may train the first plurality of supervised machine learning models and the second plurality of unsupervised machine learning models by providing the augmented training dataset as input to each supervised machine learning of the first plurality of supervised machine learning models and each unsupervised machine learning model of the second plurality of unsupervised machine learning models. In some non-limiting embodiments or aspects, an unmodified training dataset may be provided by ensemble learning system 102 as input to the first and second pluralities of machine learning models.

As shown in FIG. 3, at step 308, process 300 may include generating an ensemble machine learning model. In some non-limiting embodiments or aspects, ensemble learning system 102 may generate an ensemble machine learning model based on outputs of the first plurality of supervised machine learning models and outputs of the second plurality of unsupervised machine learning models. For example, ensemble learning system 102 may generate an ensemble machine learning model by providing the classification scores from each supervised machine learning model and clustering values from each unsupervised machine learning model to another machine learning for training on the collected output values. In some non-limiting embodiments or aspects, ensemble learning system 102 may generate an ensemble machine learning model through ensemble learning based on outputs of the first plurality of supervised machine learning models and outputs of the second plurality of unsupervised machine learning models. In some non-limiting embodiments or aspects, the generated ensemble model may be trained on its own output by using a feedback loop.

As shown in FIG. 3, at step 310, process 300 may include generating a runtime output. In some non-limiting embodiments or aspects, ensemble learning system 102 may generate a runtime output of the ensemble machine learning model based on a runtime input to the ensemble machine learning model. In some non-limiting embodiments or aspects, a runtime output may include an output that is generated by ensemble learning system 102 when ensemble learning system 102 is executing in a production environment. In some non-limiting embodiments or aspects, a runtime input may include an input that is received by ensemble learning system 102 when ensemble learning system 102 is executing in a production environment.

In some non-limiting embodiments or aspects, runtime may include the period of time where ensemble learning system 102 is executing in a production environment. For example, ensemble learning system 102 may be in runtime when ensemble learning system 102 is put into operation for its intended use by users and ensemble learning system 102 is executing on production hardware for daily operation of ensemble learning system 102. In other words, runtime may include a period of time when ensemble learning system 102 is available as a live service to clients. In some non-limiting embodiments or aspects, runtime may refer to the status of ensemble learning system. For example, ensemble learning system 102 may be in runtime (e.g., ensemble learning system 102 is live) as opposed to a status of development or testing.

In some non-limiting embodiments or aspects, ensemble learning system 102 may generate a final prediction output with the ensemble machine learning model in real time with respect to a transaction data input provided to the ensemble machine learning model during runtime. In some non-limiting embodiments or aspects, the accuracy of the ensemble machine learning model may be greater than the accuracy of supervised and unsupervised machine learning models alone. In some non-limiting embodiments or aspects, the accuracy of the ensemble machine learning model may be greater than the accuracy of individual supervised machine learning models and individual unsupervised machine learning models over time.

In some non-limiting embodiments or aspects, real time may include an instant in time with respect to the occurrence of an event (e.g., real time with respect to a transaction, real time with respect to the reading or writing of data, etc.) where a response may occur within a specified time, generally a relatively short time. For example, real time may refer to an instant in time where a perturbation is added to a data instance concurrent with or shortly after (e.g., within milliseconds) the collection and storage of the corresponding data instance. As a further example, a real time output may be generated with respect to a real time input concurrent with or within milliseconds of receiving the real time input (e.g., a transaction being approved immediately concurrent with or shortly after the transaction is initiated).

Referring now to FIGS. 4A-4E FIGS. 4A-4E are diagrams of an implementation 400 of a process (e.g., process 300) for generating a machine learning model based on an ensemble learning method using supervised and unsupervised techniques. As illustrated in FIGS. 4A-4E, implementation 400 may include ensemble learning system 102 performing the steps of the process.

As shown by reference number 510 in FIG. 4A, ensemble learning system 102 may receive a training dataset of a plurality of data instances. In some non-limiting embodiments or aspects, ensemble learning system 102 may receive a preexisting training dataset stored in a storage component. In some non-limiting embodiments or aspects, ensemble learning system 102 may receive a training dataset that is generated in real time. For example, ensemble learning system 102 may receive real time image data (e.g. video data, medical imaging data, and/or the like) as the image data is being collected. As a further example, ensemble learning system 102 may receive real time transaction data as a transaction initiated by a customer is being processed.

In some non-limiting embodiments or aspects, the training dataset may include output from one or more machine learning models. In some non-limiting embodiments or aspects, the training dataset may include a complete dataset or an incomplete dataset. In other non-limiting embodiments or aspects, the training dataset may include data from a plurality of different datasets.

Figure 4B:
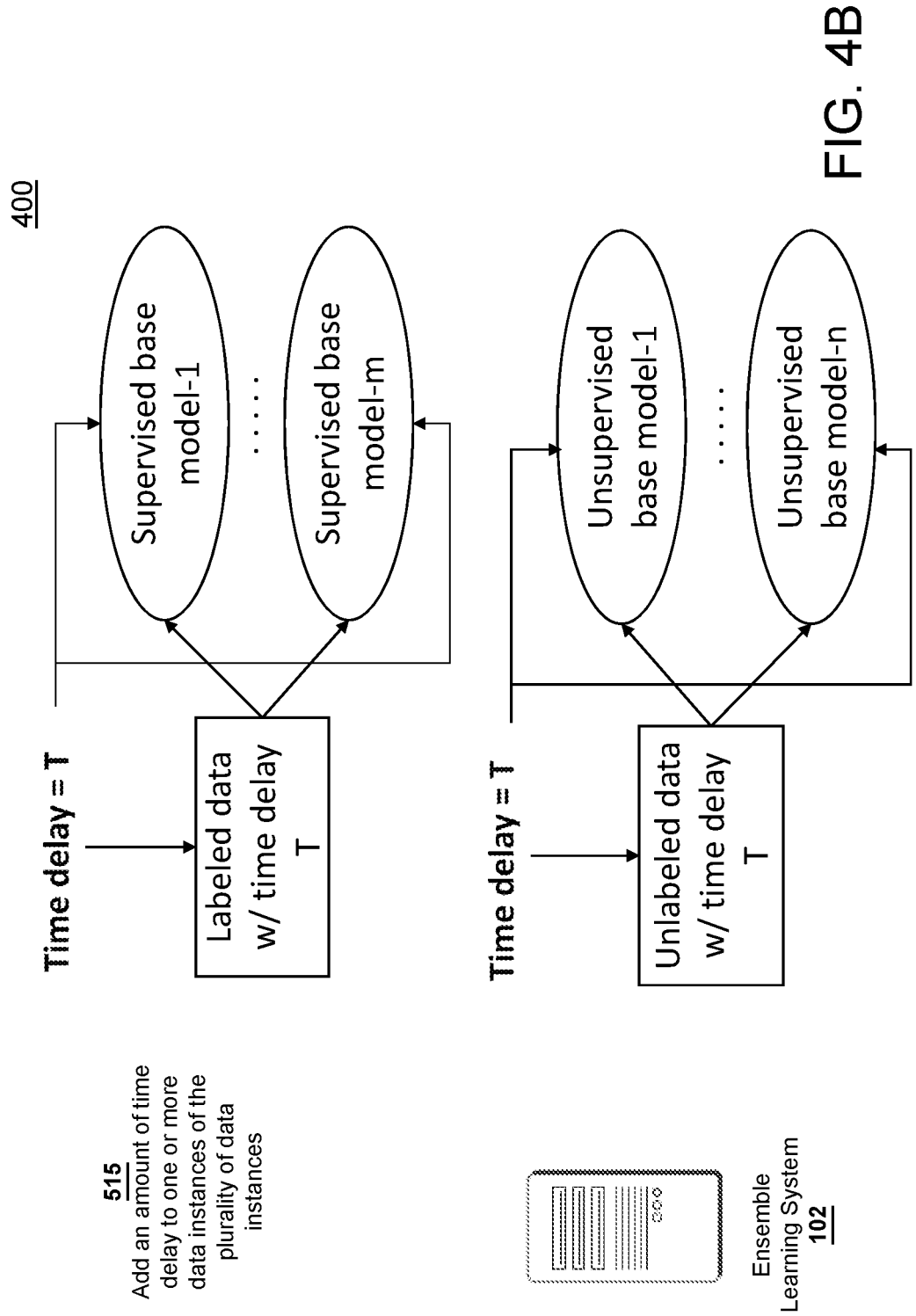

As shown by reference number 515 in FIG. 4B, ensemble learning system 102 may add an amount of time delay to one or more data instances of the plurality of data instances. In some non-limiting embodiments or aspects, ensemble learning system 102 may add an amount of time delay to one or more data instances of the plurality of data instances by inserting new and/or preexisting data instances into the plurality of data instances at specified time intervals. In some non-limiting embodiments or aspects, the time intervals for inserting new and/or preexisting data instances into the plurality of data instances may be random. In some non-limiting embodiments or aspects, ensemble learning system 102 may add an amount of time delay to one or more data instances of the plurality of data instances by removing data instances from the plurality of data instances at specified time intervals. In some non-limiting embodiments or aspects, the time intervals for removing data instances from the plurality of data instances may be random. In some non-limiting embodiments or aspects, an amount of time delay may be generated continuously within the plurality of data instances. Additionally or alternatively, a time delay may be generated at specific time intervals, from a time equal to 0 to a selected upper bound. Ensemble learning system 102 may add an amount of time delay to one or more labeled data instances and/or one or more unlabeled data instances. In some non-limiting embodiments or aspects, the amount of time delay may be input to one or more supervised models and/or one or more unsupervised models being trained.

In some non-limiting embodiments or aspects, ensemble learning system 102 may add other perturbations to one or more data instances of the plurality of data instances. For example, ensemble learning system 102 may add an amount of spatial deformation to image segments in segmented image data. As a further example, ensemble learning system 102 may perturb the model weights of a machine learning model being trained. Ensemble learning system 102 may add other perturbations to the training dataset or to the machine learning model being trained through ensemble learning by adding adversarial examples to one or more data instances in the plurality of data instances (e.g., modifying data, mislabeling data, adding noise, and/or the like).

Figure 4C:
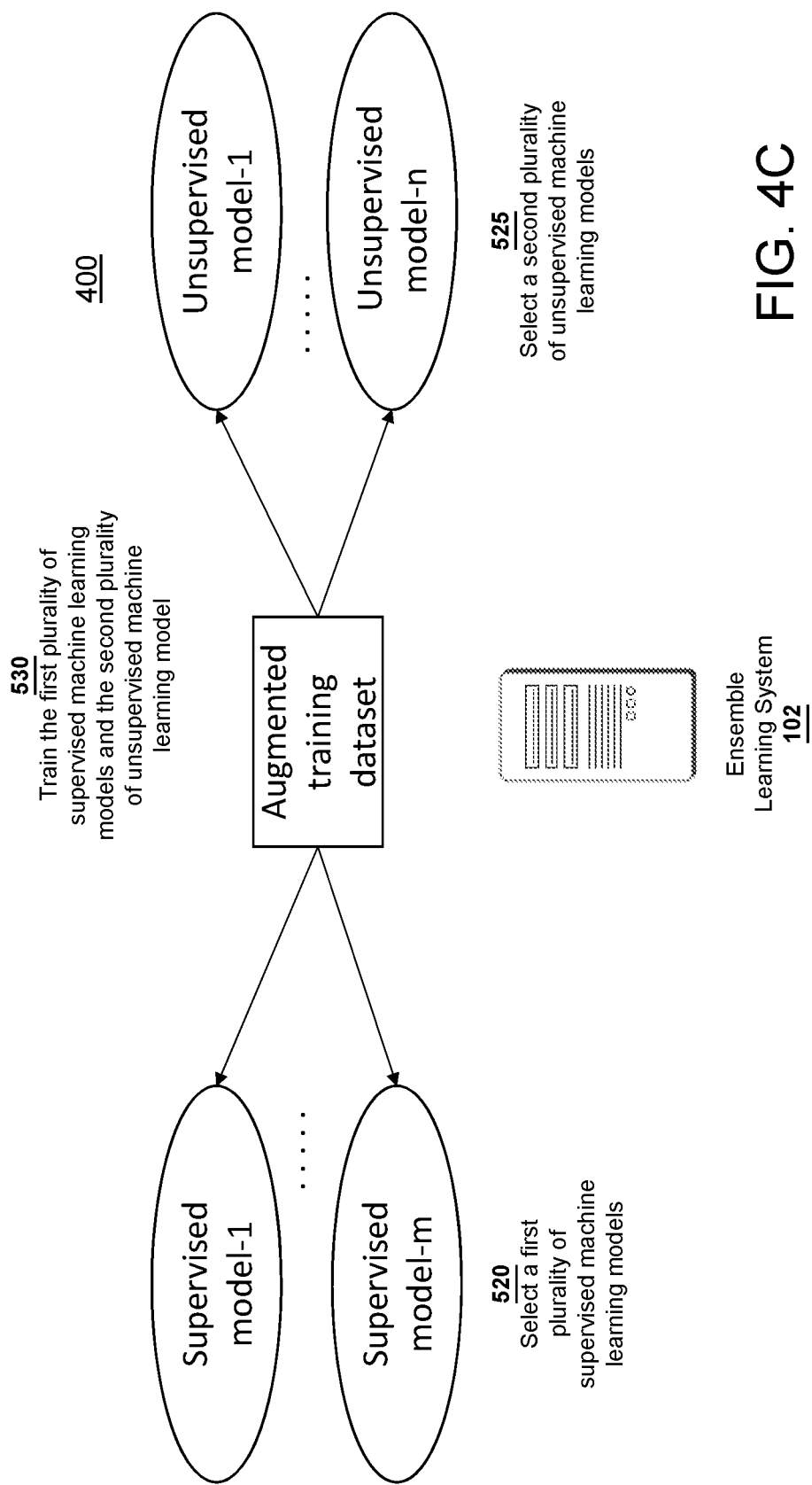

As shown by reference number 520 in FIG. 4C, ensemble learning system 102 may select a first plurality of supervised machine learning models. In some non-limiting embodiments or aspects, ensemble learning system 102 may select the first plurality of supervised machine learning models by determining a measure of sensitivity of each supervised machine learning model of a group of supervised machine learning models to a time delay based on the augmented training dataset. Ensemble learning system 102 may select a subset of the group of supervised machine learning models based on the measure of sensitivity of each supervised machine learning model to a time delay. In some non-limiting embodiments or aspects, the measure of sensitivity of a supervised machine learning model to a time delay may include a measure of a change in accuracy of the supervised machine learning model with regard to the training dataset compared to the augmented training dataset. In some non-limiting embodiments or aspects, ensemble learning system 102 may select the first plurality of supervised machine learning models based on the supervised machine learning models having different measures of sensitivity to different data (e.g., based on PAN history, device or Internet Protocol (IP) address, account information, etc.). In some non-limiting embodiments or aspects, ensemble learning system 102 may select the first plurality of supervised machine learning models based on the type of machine learning model algorithm (e.g., support vector machine (SVM), decision tree, neural network (NN), and/or the like). In some non-limiting embodiments or aspects, ensemble learning system 102 may select the first plurality of supervised machine learning models based on the size of the training datasets that will be used for training the plurality of supervised machine learning models. In other non-limiting embodiments or aspects, ensemble learning system 102 may select the first plurality of supervised machine learning models based on the processing speed of the model. In some non-limiting embodiments or aspects, ensemble learning system 102 may select the first plurality of supervised machine learning models based on the type of data instances in the training dataset, the domain of the training dataset, and/or the use cases associated with the training dataset (e.g., image classification, audio classification, text classification, and/or the like).

As shown by reference number 525 in FIG. 4C, ensemble learning system 102 may select a second plurality of unsupervised machine learning models. In some non-limiting embodiments or aspects, ensemble learning system 102 may select a second plurality of unsupervised machine learning models by determining a measure of sensitivity of each unsupervised machine learning model of a group of unsupervised machine learning models to a time delay based on the augmented training dataset. Ensemble learning system 102 may select a subset of the group of unsupervised machine learning models based on the measure of sensitivity of each unsupervised machine learning model to a time delay. In some non-limiting embodiments or aspects, the measure of sensitivity of an unsupervised machine learning model to a time delay may include a measure of a change in accuracy of the unsupervised machine learning model with regard to the training dataset compared to the augmented training dataset. In some non-limiting embodiments or aspects, ensemble learning system 102 may select the second plurality of unsupervised machine learning models based on the unsupervised machine learning models having different measures of sensitivity to different data. In some non-limiting embodiments or aspects, ensemble learning system 102 may select the second plurality of unsupervised machine learning models based on the type of machine learning model algorithm (e.g., principal component analysis (PCA), autoencoders, and/or the like). In some non-limiting embodiments or aspects, ensemble learning system 102 may select the second plurality of unsupervised machine learning models based on the size of the training datasets that will be used for training the plurality of unsupervised machine learning models. In other non-limiting embodiments or aspects, ensemble learning system 102 may select the second plurality of unsupervised machine learning models based on the processing speed of the model. In some non-limiting embodiments or aspects, ensemble learning system 102 may select the second plurality of unsupervised machine learning models based on the type of data instances in the training dataset, the domain of the training dataset, and/or the use cases associated with the training dataset (e.g., object recognition, customer personas, product recommendations, and/or the like).

As shown by reference number 530 in FIG. 4C, ensemble learning system 102 may train the first plurality of supervised machine learning models and the second plurality of unsupervised machine learning models based on the augmented training dataset. In some non-limiting embodiments or aspects, a single augmented training dataset may be used to train each supervised machine learning model of the first plurality of supervised machine learning models and each unsupervised machine learning model of the second plurality of unsupervised machine learning models. In some non-limiting embodiments or aspects, different augmented training datasets may be used to train each machine learning model of the plurality of machine learning models. In some non-limiting embodiments or aspects, one or more augmented training datasets may be used to train each machine learning model of the plurality of machine learning models.

In some non-limiting embodiments or aspects, ensemble learning system 102 may train the first plurality of supervised machine learning models based on supervised learning algorithms, such as neural networks, Naive Bayes, linear regression, logistic regression, support vector machine, decision tree, random forest, and/or the like. In some non-limiting embodiments or aspects, ensemble learning system 102 may train the first plurality of supervised machine learning models using different types of data instances in a training dataset (e.g., based on PAN history, device or IP address, account information, etc.).

In some non-limiting embodiments or aspects, ensemble learning system 102 may train the second plurality of unsupervised machine learning models based on principal component analysis, autoencoders, singular value decomposition, k-means clustering, and/or the like.

In some non-limiting embodiments or aspects, ensemble learning system 102 may train the plurality of machine learning models using different training datasets having different amounts of time delay as input to each supervised and unsupervised machine learning model. In some non-limiting embodiments or aspects, ensemble learning system 102 may train the plurality of machine learning models using training datasets with different sampling techniques in order to minimize data bias.

As shown by reference number 535 in FIG. 4D, ensemble learning system 102 may generate an ensemble machine learning model based on outputs of the first plurality of supervised machine learning models and outputs of the second plurality of unsupervised machine learning models. In some non-limiting embodiments or aspects, the outputs of the first plurality of supervised machine learning models may include classification values. In some non-limiting embodiments or aspects, the classification values may correspond to the performance of the supervised machine learning model. In some non-limiting embodiments or aspects, each data instance in the plurality of data instances may be assigned a classification value based on the performance of the supervised machine learning model outputting the data. In some non-limiting embodiments or aspects, each supervised machine learning model may output one or more classification values based on the number of data instances in the training dataset. In some non-limiting embodiments or aspects, the classification values may be input into the ensemble machine learning model for training in order to generate an ensemble machine learning model.

In some non-limiting embodiments or aspects, the outputs of the second plurality of unsupervised machine learning models may include data clusters (e.g., cluster of similar data objects). In some non-limiting embodiments or aspects, the data clusters may correspond to the performance of the unsupervised machine learning model. In some non-limiting embodiments or aspects, each data instance in the plurality of data instances may be assigned to a cluster based on the performance of the unsupervised machine learning model outputting the data. In some non-limiting embodiments or aspects, each unsupervised machine learning model may output one or more clusters. In some non-limiting embodiments or aspects, the data clusters may be input into the ensemble machine learning model for training in order to generate an ensemble machine learning model.

In some non-limiting embodiments or aspects, ensemble learning system 102 may generate the ensemble machine learning model based on the Bayes optimal classifier, boosting, Bayesian model averaging, bucket of models, stacking, and/or the like. In some non-limiting embodiments or aspects, ensemble learning system 102 may generate the ensemble machine learning model based on a combination of clustering models (e.g. co-association, meta-clustering, and/or the like). In some non-limiting embodiments or aspects, ensemble learning system 102 may generate the ensemble machine learning model based on all supervised and unsupervised machine learning model outputs as input to the ensemble machine learning model. In other non-limiting embodiments or aspects, ensemble learning system 102 may generate the ensemble machine learning model based on a portion of supervised and unsupervised machine learning model outputs as input to the ensemble machine learning model. In some non-limiting embodiments or aspects, ensemble learning system 102 may generate the ensemble machine learning model based on the output of other ensemble machine learning models.

In some non-limiting embodiments or aspects, ensemble learning system 102 may generate an output of the ensemble machine learning model based on the outputs of the first plurality of supervised machine learning models and the outputs of the second plurality of unsupervised machine learning models.

As shown by reference number 540 in FIG. 4D, ensemble learning system 102 may generate a runtime output of the ensemble machine learning model based on a runtime input to the ensemble machine learning model. In some non-limiting embodiments or aspects, the runtime output may be based on an added amount of time delay determined by comparing a current real time to a predetermined time of an event associated with a data instance. In some non-limiting embodiments or aspects, a current real time may include the time measured at the instant an action is performed (e.g., when the time delay is added, when the model is trained on a training dataset, when the model receives a data instance, etc.). For example, when ensemble learning system 102 generates a runtime output of the ensemble machine learning model based on a runtime input to the ensemble machine learning model, ensemble learning system 102 may determine an amount of time delay by comparing the time at the instant an input data instance is read by the ensemble machine learning model to a time of an event associated with the input data instance. As a further example, ensemble learning system 102 may determine an amount of time delay by comparing the time the ensemble machine learning model receives a transaction data instance as input to the time the transaction event occurred. The time the transaction event occurred may be determined based on a timestamp or the transaction and/or the like. In some non-limiting embodiments or aspects, generating a runtime output of the ensemble machine learning model based on a runtime input to the ensemble machine learning model may occur in real time with respect to receiving the runtime input.

In some non-limiting embodiments or aspects, ensemble learning system 102 may generate a runtime output of the ensemble machine learning model where the output of the ensemble machine learning model may include a final prediction based on the runtime input to the ensemble machine learning model. For example, ensemble learning system 102 may generate a runtime output including a prediction for transaction approval (e.g., Visa® Stand-In Processing (STIP)) based on real time transaction data input to the ensemble machine learning model received during runtime. In other non-limiting embodiments or aspects, ensemble learning system 102 may generate a runtime output including a fraudulent transaction prediction based on real time transaction data input received during runtime. In some non-limiting embodiments or aspects, ensemble learning system 102 may generate a runtime output of the ensemble machine learning model to be used in a feedback loop to provide the ensemble machine learning model with additional input. Ensemble learning system 102 may provide the feedback loop of the ensemble machine learning model as a continuous feedback loop. Alternatively, ensemble learning system 102 may select specific instances of output to provide as feedback to the ensemble machine learning model. In some non-limiting embodiments or aspects, ensemble learning system 102 may train the ensemble machine learning model using backpropagation based on the output of the ensemble machine learning model.

In some non-limiting embodiments or aspects, ensemble learning system 102 may perform an action based on the runtime output of the ensemble machine learning model. For example, ensemble learning system 102 may approve or deny a transaction based on the runtime output of the ensemble machine learning model where the output prediction includes STIP transaction approval. In some non-limiting embodiments or aspects, ensemble learning system 102 may perform the action in real time with respect to generating the runtime output of the ensemble machine learning model.

Figure 4E:
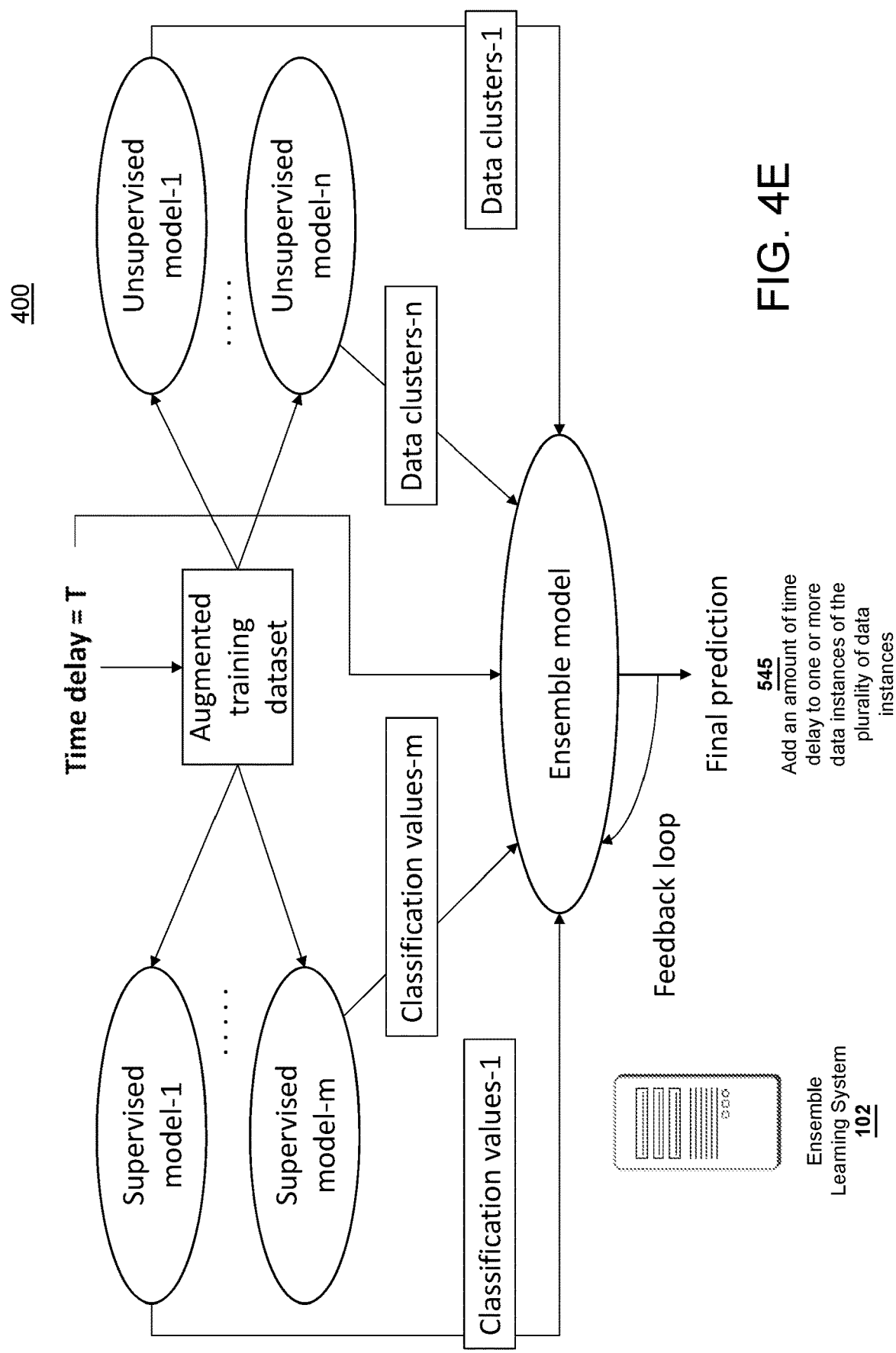

As shown by reference number 545 in FIG. 4E, ensemble learning system 102 may add an amount of time delay to one or more data instances of the plurality of data instances to provide an augmented training dataset. In some non-limiting embodiments or aspects, ensemble learning system 102 may add an amount of time delay to one or more data instances of the plurality of data instances of a training dataset such that the amount of time delay is input to the ensemble machine learning model for training and/or generating a real time output during runtime. In some non-limiting embodiments or aspects, the amount of time delay may be an input feature. For example, the amount of time delay may be added as an input feature to the one or more data instances of the plurality of data instances to provide the augmented training dataset. Additionally or alternatively, the amount of time delay may be added as an input feature of an input provided to the ensemble machine learning model. In some non-limiting embodiments, ensemble learning system 102 may provide the amount of time delay as an input feature of an input to the ensemble machine learning model. For example, ensemble learning system 102 may provide the amount of time delay as an input feature to the ensemble machine learning model during a training process. In some non-limiting embodiments, the ensemble machine learning model may be trained with an amount of time delay as a direct model input variable.

Although the above methods, systems, and computer program products have been described in detail for the purpose of illustration based on what is currently considered to be the most practical and preferred embodiments, it is to be understood that such detail is solely for that purpose and that the present disclosure is not limited to the described embodiments but, on the contrary, is intended to cover modifications and equivalent arrangements that are within the spirit and scope of the appended claims. For example, it is to be understood that the present disclosure contemplates that, to the extent possible, one or more features of any embodiment or aspect can be combined with one or more features of any other embodiment or aspect.

What is claimed is:

1. A system for ensemble learning with machine learning models to prevent model performance degradation, the system comprising:
at least one processor programmed or configured to:
receive a training dataset of a plurality of data instances, wherein each data instance comprises a time series of data points;
add an amount of time delay to one or more data instances of the plurality of data instances to provide an augmented training dataset, wherein, when adding the amount of time delay to one or more data instances of the plurality of data instances to provide the augmented training dataset, the at least one processor is further programmed or configured to:
add the amount of time delay to a plurality of labeled data instances to provide a plurality of augmented labeled data instances; and
add the amount of time delay to a plurality of unlabeled data instances to provide a plurality of augmented unlabeled data instances; and
wherein the augmented training dataset comprises the plurality of augmented labeled data instances and the plurality of augmented unlabeled data instances;
select a first plurality of supervised machine learning models, wherein the first plurality of supervised machine learning models comprises a plurality of neural network machine learning models trained using supervised learning techniques, and wherein, when selecting the first plurality of supervised machine learning models, the at least one processor is programmed or configured to:
determine a measure of sensitivity of each supervised machine learning model of a group of supervised machine learning models to a time delay based on the plurality of augmented labeled data instances of the augmented training dataset, wherein the measure of sensitivity of a supervised machine learning model to a time delay comprises a measure of a change in accuracy of the supervised machine learning model with regard to the training dataset compared to the augmented training dataset; and
select a subset of the group of supervised machine learning models as the first plurality of supervised machine learning models based on the measure of sensitivity of each supervised machine learning model to a time delay, wherein the first plurality of supervised machine learning models comprises two or more machine learning models;
select a second plurality of unsupervised machine learning models, wherein, when selecting the second plurality of unsupervised machine learning models, the at least one processor is programmed or configured to:
determine a measure of sensitivity of each unsupervised machine learning model of a group of unsupervised machine learning models to a time delay based on the plurality of augmented unlabeled data instances of the augmented training dataset, wherein the measure of sensitivity of an unsupervised machine learning model to a time delay comprises a measure of a change in accuracy of the unsupervised machine learning model with regard to the training dataset compared to the augmented training dataset; and
select a subset of the group of unsupervised machine learning models as the second plurality of unsupervised machine learning models based on the measure of sensitivity of each unsupervised machine learning model to a time delay, wherein the second plurality of unsupervised machine learning models comprises two or more machine learning models;
train the first plurality of supervised machine learning models and the second plurality of unsupervised machine learning models based on the augmented training dataset;

generate an ensemble machine learning model based on outputs of the first plurality of supervised machine learning models and outputs of the second plurality of unsupervised machine learning models, wherein, when generating the ensemble machine learning model, the at least one processor is programmed or configured to:
  provide outputs from each of the first plurality of supervised machine learning models and outputs from each of the second plurality of unsupervised machine learning models as inputs to the ensemble machine learning model;
  train the ensemble machine learning model using backpropagation based on outputs of the ensemble machine learning model;
generate a runtime output of the ensemble machine learning model based on a runtime input to the ensemble machine learning model, wherein, when generating the runtime output of the ensemble machine learning model, the at least one processor is programmed or configured to:
  generate a final prediction output with the ensemble machine learning model as the runtime output in real time with respect to a real time transaction data input provided to the ensemble machine learning model during runtime; and
perform an action in real time based on the runtime output of the ensemble machine learning model, wherein, when performing the action, the at least one processor is programmed or configured to:
  approve or deny an electronic payment transaction of a payment network in real time based on the runtime output of the ensemble machine learning model.

2. The system of claim 1, wherein when generating the ensemble machine learning model, the at least one processor is programmed or configured to:
  generate an output of the ensemble machine learning model based on the outputs of the first plurality of supervised machine learning models and the outputs of the second plurality of unsupervised machine learning models; and
  train the ensemble machine learning model using backpropagation based on the output of the ensemble machine learning model.

3. The system of claim 1, wherein the at least one processor is further programmed or configured to:
  add a perturbation to one or more additional data instances of the plurality of data instances; and
  add the one or more additional data instances of the plurality of data instances to the augmented training dataset.

4. A method for ensemble learning with machine learning models to prevent model performance degradation, the method comprising:
  receiving, with at least one processor, a training dataset of a plurality of data instances, wherein each data instance comprises a time series of data points;
  adding, with at least one processor, an amount of time delay to one or more data instances of the plurality of data instances to provide an augmented training dataset, wherein adding the amount of time delay to one or more data instances of the plurality of data instances to provide the augmented training dataset comprises:
    adding the amount of time delay to a plurality of labeled data instances to provide a plurality of augmented labeled data instances; and
    adding the amount of time delay to a plurality of unlabeled data instances to provide a plurality of augmented unlabeled data instances; and
    wherein the augmented training dataset comprises the plurality of augmented labeled data instances and the plurality of augmented unlabeled data instances;
  selecting, with at least one processor, a first plurality of supervised machine learning models, wherein the first plurality of supervised machine learning models comprises a plurality of neural network machine learning models trained using supervised learning techniques, and wherein selecting the first plurality of supervised machine learning models comprises:
    determining a measure of sensitivity of each supervised machine learning model of a group of supervised machine learning models to a time delay based on the plurality of augmented labeled data instances of the augmented training dataset, wherein the measure of sensitivity of a supervised machine learning model to a time delay comprises a measure of a change in accuracy of the supervised machine learning model with regard to the training dataset compared to the augmented training dataset; and
    selecting a subset of the group of supervised machine learning models as the first plurality of supervised machine learning models based on the measure of sensitivity of each supervised machine learning model to a time delay, wherein the first plurality of supervised machine learning models comprises two or more machine learning models;
  selecting, with at least one processor, a second plurality of unsupervised machine learning models, wherein selecting the second plurality of unsupervised machine learning models comprises:
    determining a measure of sensitivity of each unsupervised machine learning model of a group of unsupervised machine learning models to a time delay based on the plurality of augmented unlabeled data instances of the augmented training dataset, wherein the measure of sensitivity of an unsupervised machine learning model to a time delay comprises a measure of a change in accuracy of the unsupervised machine learning model with regard to the training dataset compared to the augmented training dataset; and
    selecting a subset of the group of unsupervised machine learning models as the second plurality of unsupervised machine learning models based on the measure of sensitivity of each unsupervised machine learning model to a time delay, wherein the second plurality of unsupervised machine learning models comprises two or more machine learning models;
  training, with at least one processor, the first plurality of supervised machine learning models and the second plurality of unsupervised machine learning models based on the augmented training dataset;
  generating, with at least one processor, an ensemble machine learning model based on outputs of the first plurality of supervised machine learning models and outputs of the second plurality of unsupervised machine learning models, wherein generating the ensemble machine learning model comprises:
    providing outputs from each of the first plurality of supervised machine learning models and outputs from each of the second plurality of unsupervised machine learning models as inputs to the ensemble machine learning model;
training the ensemble machine learning model using backpropagation based on outputs of the ensemble machine learning model;
generating, with at least one processor, a runtime output of the ensemble machine learning model based on a runtime input to the ensemble machine learning model, wherein generating the runtime output of the ensemble machine learning model comprises:
generating a final prediction output with the ensemble machine learning model as the runtime output in real time with respect to a real time transaction data input provided to the ensemble machine learning model during runtime; and
performing an action in real time based on the runtime output of the ensemble machine learning model, wherein performing the action comprises:
approving or denying an electronic payment transaction of a payment network in real time based on the runtime output of the ensemble machine learning model.

5. The method of claim 4, wherein generating the ensemble machine learning model comprises:
generating an output of the ensemble machine learning model based on the outputs of the first plurality of supervised machine learning models and the outputs of the second plurality of unsupervised machine learning models; and
training the ensemble machine learning model using backpropagation based on the output of the ensemble machine learning model.

6. The method of claim 4 further comprising:
adding a perturbation to one or more additional data instances of the plurality of data instances; and
adding the one or more additional data instances of the plurality of data instances to the augmented training dataset.

7. A computer program product for ensemble learning with machine learning models to prevent model performance degradation, the computer program product comprising at least one non-transitory computer-readable medium including one or more instructions that, when executed by at least one processor, cause the at least one processor to:
receive a training dataset of a plurality of data instances, wherein each data instance comprises a time series of data points;
add an amount of time delay to one or more data instances of the plurality of data instances to provide an augmented training dataset, wherein, the one or more instructions that cause the at least one processor to add the amount of time delay to one or more data instances of the plurality of data instances to provide the augmented training dataset, cause the at least one processor to:
add the amount of time delay to a plurality of labeled data instances to provide a plurality of augmented labeled data instances; and
add the amount of time delay to a plurality of unlabeled data instances to provide a plurality of augmented unlabeled data instances; and
wherein the augmented training dataset comprises the plurality of augmented labeled data instances and the plurality of augmented unlabeled data instances;
select a first plurality of supervised machine learning models, wherein the first plurality of supervised machine learning models comprises a plurality of neural network machine learning models trained using supervised learning techniques, and wherein, the one or more instructions that cause the at least one processor to select the first plurality of supervised machine learning models, cause the at least one processor to:
determine a measure of sensitivity of each supervised machine learning model of a group of supervised machine learning models to a time delay based on the plurality of augmented labeled data instances of the augmented training dataset, wherein the measure of sensitivity of a supervised machine learning model to a time delay comprises a measure of a change in accuracy of the supervised machine learning model with regard to the training dataset compared to the augmented training dataset; and
select a subset of the group of supervised machine learning models as the first plurality of supervised machine learning models based on the measure of sensitivity of each supervised machine learning model to a time delay, wherein the first plurality of supervised machine learning models comprises two or more machine learning models;
select a second plurality of unsupervised machine learning models, wherein, the one or more instructions that cause the at least one processor to select the second plurality of unsupervised machine learning models, cause the at least one processor to:
determine a measure of sensitivity of each unsupervised machine learning model of a group of unsupervised machine learning models to a time delay based on the plurality of augmented unlabeled data instances of the augmented training dataset, wherein the measure of sensitivity of an unsupervised machine learning model to a time delay comprises a measure of a change in accuracy of the unsupervised machine learning model with regard to the training dataset compared to the augmented training dataset; and
select a subset of the group of unsupervised machine learning models as the second plurality of unsupervised machine learning models based on the measure of sensitivity of each unsupervised machine learning model to a time delay, wherein the second plurality of unsupervised machine learning models comprises two or more machine learning models;
train the first plurality of supervised machine learning models and the second plurality of unsupervised machine learning models based on the augmented training dataset;
generate an ensemble machine learning model based on outputs of the first plurality of supervised machine learning models and outputs of the second plurality of unsupervised machine learning models, wherein, the one or more instructions that cause the at least one processor to generate the ensemble machine learning model, cause the at least one processor to:
provide outputs from each of the first plurality of supervised machine learning models and outputs from each of the second plurality of unsupervised machine learning models as inputs to the ensemble machine learning model;
train the ensemble machine learning model using backpropagation based on outputs of the ensemble machine learning model;
generate a runtime output of the ensemble machine learning model based on a runtime input to the ensemble machine learning model, wherein the one or more instructions that cause the at least one processor to generate the runtime output of the ensemble machine learning model, cause the at least one processor to:

generate a final prediction output with the ensemble machine learning model as the runtime output in real time with respect to a real time transaction data input provided to the ensemble machine learning model during runtime; and perform an action in real time based on the runtime output of the ensemble machine learning model, wherein the one or more instructions that cause the at least one processor to perform the action, cause the at least one processor to:

approve or deny an electronic payment transaction of a payment network in real time based on the runtime output of the ensemble machine learning model.

8. The computer program product of claim 7, wherein the one or more instructions that cause the at least one processor to generate the ensemble machine learning model cause the at least one processor to:

generate an output of the ensemble machine learning model based on the outputs of the first plurality of supervised machine learning models and the outputs of the second plurality of unsupervised machine learning models; and train the ensemble machine learning model using back-propagation based on the output of the ensemble machine learning model.

9. The computer program product of claim 7, wherein the one or more instructions further cause the at least one processor to:

add a perturbation to one or more additional data instances of the plurality of data instances; and add the one or more additional data instances of the plurality of data instances to the augmented training dataset.

\* \* \* \* \*